United States Patent
Ang et al.

(10) Patent No.: US 12,192,116 B2
(45) Date of Patent: *Jan. 7, 2025

(54) CONFIGURING PNIC TO PERFORM FLOW PROCESSING OFFLOAD USING VIRTUAL PORT IDENTIFIERS

(71) Applicant: VMware LLC, Palo Alto, CA (US)

(72) Inventors: Boon S. Ang, Saratoga, CA (US); Wenyi Jiang, Fremont, CA (US); Guolin Yang, San Jose, CA (US); Jin Heo, Los Altos, CA (US); Srividya Murali, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,860

(22) Filed: Aug. 20, 2023

(65) Prior Publication Data

US 2023/0396563 A1    Dec. 7, 2023

Related U.S. Application Data

(63) Continuation of application No. 17/114,994, filed on Dec. 8, 2020, now Pat. No. 11,792,134.

(Continued)

(51) Int. Cl.
    *H04L 47/80*      (2022.01)
    *H04L 45/00*      (2022.01)
    (Continued)

(52) U.S. Cl.
    CPC .............. *H04L 47/80* (2013.01); *H04L 45/38* (2013.01); *H04L 47/12* (2013.01); *H04L 47/781* (2013.01);
    (Continued)

(58) Field of Classification Search
    CPC ......... H04L 47/80; H04L 45/38; H04L 47/12; H04L 47/781; H04L 49/109; H04L 49/3009; H04L 49/70
    (Continued)

(56) References Cited

U.S. PATENT DOCUMENTS 5,884,313 A    3/1999   Talluri et al.
5,887,134 A    3/1999   Ebrahim
(Continued)

FOREIGN PATENT DOCUMENTS

CA    2672100 A1    6/2008
CA    2918551 A1    7/2010
(Continued)

OTHER PUBLICATIONS

Turner, Jon, et al., "Supercharging PlanetLab—High Performance, Multi-Application Overlay Network Platform," SIGCOMM-07, Aug. 27-31, 2007, 12 pages, ACM, Koyoto, Japan.
(Continued)

*Primary Examiner* — Nicholas R Taylor
*Assistant Examiner* — Chong G Kim
(74) *Attorney, Agent, or Firm* — Quarles & Brady LLP

(57) ABSTRACT

Some embodiments of the invention provide a method for configuring a physical network card or physical network controller (pNIC) to provide flow processing offload (FPO) for a host computer connected to the pNIC. The host computers host a set of compute nodes in a virtual network. The set of compute nodes are each associated with a set of interfaces that are each assigned a locally-unique virtual port identifier (VPID) by a flow processing and action generator. The pNIC includes a set of interfaces that are assigned physical port identifiers (PPIDs) by the pNIC. The method includes providing the pNIC with a set of mappings between VPIDs and PPIDs. The method also includes sending (Continued)

updates to the mappings as compute nodes migrate, connect to different interfaces of the pNIC, are assigned different VPIDs, etc. In some embodiments, the flow processing and action generator executes on processing units of the host computer, while in other embodiments, the flow processing and action generator executes on a set of processing units of a pNIC that includes flow processing hardware and a set of programmable processing units.

20 Claims, 16 Drawing Sheets

Related U.S. Application Data

(60) Provisional application No. 63/084,436, filed on Sep. 28, 2020.

(51) Int. Cl.
  *H04L 47/12* (2022.01)
  *H04L 47/78* (2022.01)
  *H04L 49/00* (2022.01)
  *H04L 49/109* (2022.01)

(52) U.S. Cl.
  CPC ........ *H04L 49/109* (2013.01); *H04L 49/3009* (2013.01); *H04L 49/70* (2013.01)

(58) Field of Classification Search
  USPC ...................................................... 709/226
  See application file for complete search history.

(56) References Cited

U.S. PATENT DOCUMENTS

| | | |
|---|---|---|
| 5,974,547 A | 10/1999 | Klimenko |
| 6,141,749 A | 10/2000 | Coss et al. |
| 6,219,699 B1 | 4/2001 | McCloghrie et al. |
| 6,393,483 B1 | 5/2002 | Atif et al. |
| 6,496,935 B1 | 12/2002 | Fink et al. |
| 6,594,704 B1 | 7/2003 | Birenback et al. |
| 6,738,821 B1 | 5/2004 | Wilson et al. |
| 6,856,995 B1 | 2/2005 | Ibitayo et al. |
| 6,880,089 B1 | 4/2005 | Bommareddy et al. |
| 6,963,921 B1 | 11/2005 | Yang et al. |
| 7,055,173 B1 | 5/2006 | Chaganty et al. |
| 7,079,544 B2 | 7/2006 | Wakayama et al. |
| 7,136,926 B1 | 11/2006 | Iyer et al. |
| 7,349,382 B2 | 3/2008 | Marimuthu et al. |
| 7,424,710 B1 | 9/2008 | Nelson et al. |
| 7,512,071 B2 | 3/2009 | Goldschmidt et al. |
| 7,606,260 B2 | 10/2009 | Oguchi et al. |
| 7,760,733 B1 | 7/2010 | Eiriksson et al. |
| 7,774,502 B2 | 8/2010 | Murthy et al. |
| 7,818,452 B2 | 10/2010 | Matthews et al. |
| 7,849,168 B2 | 12/2010 | Utsunomiya et al. |
| 7,853,998 B2 | 12/2010 | Blaisdell et al. |
| 7,913,294 B1 | 3/2011 | Maufer et al. |
| 7,948,986 B1 | 5/2011 | Ghosh et al. |
| 8,032,933 B2 | 10/2011 | Turley et al. |
| 8,108,550 B2 | 1/2012 | Lahoti et al. |
| 8,145,768 B1 | 3/2012 | Hawthorne |
| 8,190,767 B1 | 5/2012 | Maufer et al. |
| 8,194,674 B1 | 6/2012 | Pagel et al. |
| 8,346,919 B1 | 1/2013 | Eiriksson et al. |
| 8,365,294 B2 | 1/2013 | Ross |
| 8,442,059 B1 | 5/2013 | Iglesia et al. |
| 8,615,009 B1 | 12/2013 | Ramamoorthi et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,082 B2 | 4/2015 | Dyke |
| 9,008,085 B2 | 4/2015 | Kamble et al. |
| 9,015,823 B2 | 4/2015 | Koponen et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,697,019 B1 | 7/2017 | Fitzgerald et al. |
| 9,729,512 B2 | 8/2017 | Jain et al. |
| 9,755,903 B2 | 9/2017 | Masurekar et al. |
| 9,806,948 B2 | 10/2017 | Masurekar et al. |
| 9,825,913 B2 | 11/2017 | Jain et al. |
| 9,916,269 B1 | 3/2018 | Machulsky et al. |
| 9,952,782 B1 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | BShara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | Pierre et al. |
| 10,567,308 B1 | 2/2020 | Subbiah et al. |
| 10,873,566 B2 | 12/2020 | Han |
| 10,997,106 B1 | 5/2021 | Bandaru et al. |
| 11,005,755 B2 | 5/2021 | Yu et al. |
| 11,019,030 B2 | 5/2021 | Jain et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 11,736,565 B2 | 8/2023 | Cherian et al. |
| 11,736,566 B2 | 8/2023 | Cherian et al. |
| 2002/0069245 A1 | 6/2002 | Kim |
| 2003/0005144 A1 | 1/2003 | Engel et al. |
| 2003/0093481 A1 | 5/2003 | Mitchell et al. |
| 2003/0097589 A1 | 5/2003 | Syvanne |
| 2003/0123452 A1 | 7/2003 | Cox et al. |
| 2003/0130833 A1 | 7/2003 | Brownell et al. |
| 2003/0140124 A1 | 7/2003 | Burns |
| 2003/0145114 A1 | 7/2003 | Gertner |
| 2003/0161272 A1 | 8/2003 | Teplitsky |
| 2003/0200290 A1 | 10/2003 | Zimmerman et al. |
| 2003/0212900 A1 | 11/2003 | Liu et al. |
| 2003/0217119 A1 | 11/2003 | Raman et al. |
| 2004/0022259 A1 | 2/2004 | Tuchow |
| 2004/0042464 A1 | 3/2004 | Elzur et al. |
| 2004/0049701 A1 | 3/2004 | Pennec et al. |
| 2005/0053079 A1 | 3/2005 | Havala |
| 2005/0114337 A1 | 5/2005 | Lunteren |
| 2005/0198125 A1 | 9/2005 | Beck et al. |
| 2005/0229246 A1 | 10/2005 | Rajagopal et al. |
| 2005/0238022 A1 | 10/2005 | Panigrahy |
| 2006/0002386 A1 | 1/2006 | Yik et al. |
| 2006/0029056 A1 | 2/2006 | Perera et al. |
| 2006/0041894 A1 | 2/2006 | Cheng et al. |
| 2006/0191003 A1 | 8/2006 | Bahk et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0011734 A1 | 1/2007 | Balakrishnan et al. |
| 2007/0056038 A1 | 3/2007 | Lok |
| 2007/0061492 A1 | 3/2007 | Riel |

(56) References Cited

U.S. PATENT DOCUMENTS

| | | |
|---|---|---|
| 2007/0174850 A1 | 7/2007 | Zur |
| 2008/0008202 A1 | 1/2008 | Terrell et al. |
| 2008/0028097 A1 | 1/2008 | Makela |
| 2008/0072305 A1 | 3/2008 | Casado et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2008/0289028 A1 | 11/2008 | Jansen et al. |
| 2008/0298274 A1 | 12/2008 | Takashige et al. |
| 2009/0007251 A1 | 1/2009 | Abzarian et al. |
| 2009/0089537 A1 | 4/2009 | Vick et al. |
| 2009/0119087 A1 | 5/2009 | Ang et al. |
| 2009/0129271 A1 | 5/2009 | Ramankutty et al. |
| 2009/0129394 A1 | 5/2009 | Bar-Kovetz et al. |
| 2009/0150521 A1 | 6/2009 | Tripathi |
| 2009/0161547 A1 | 6/2009 | Riddle et al. |
| 2009/0161673 A1 | 6/2009 | Breslau et al. |
| 2009/0235325 A1 | 9/2009 | Dimitrakos et al. |
| 2009/0249470 A1 | 10/2009 | Litvin et al. |
| 2009/0249472 A1 | 10/2009 | Litvin et al. |
| 2009/0327781 A1 | 12/2009 | Tripathi |
| 2010/0014526 A1 | 1/2010 | Chavan et al. |
| 2010/0037311 A1 | 2/2010 | He et al. |
| 2010/0070677 A1 | 3/2010 | Thakkar |
| 2010/0100616 A1 | 4/2010 | Bryson et al. |
| 2010/0115174 A1 | 5/2010 | Akyol et al. |
| 2010/0115208 A1 | 5/2010 | Logan |
| 2010/0125667 A1 | 5/2010 | Soundararajan |
| 2010/0165874 A1 | 7/2010 | Brown et al. |
| 2010/0257580 A1 | 10/2010 | Zhao |
| 2010/0275199 A1 | 10/2010 | Smith et al. |
| 2010/0287306 A1 | 11/2010 | Matsuda |
| 2011/0016467 A1 | 1/2011 | Kane |
| 2011/0022695 A1 | 1/2011 | Dalal et al. |
| 2011/0060859 A1 | 3/2011 | Shukla et al. |
| 2011/0072486 A1 | 3/2011 | Hadar et al. |
| 2011/0103259 A1 | 5/2011 | Aybay et al. |
| 2011/0113467 A1 | 5/2011 | Agarwal et al. |
| 2011/0134920 A1 | 6/2011 | Dyke |
| 2011/0219170 A1 | 9/2011 | Frost et al. |
| 2011/0225647 A1 | 9/2011 | Dilley et al. |
| 2011/0246637 A1 | 10/2011 | Murakami |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207039 A1 | 8/2012 | Srinivasan et al. |
| 2012/0207174 A1 | 8/2012 | Shieh |
| 2012/0240182 A1 | 9/2012 | Narayanaswamy et al. |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0007740 A1 | 1/2013 | Kikuchi et al. |
| 2013/0033993 A1 | 2/2013 | Cardona et al. |
| 2013/0044631 A1 | 2/2013 | Biswas et al. |
| 2013/0058346 A1 | 3/2013 | Sridharan et al. |
| 2013/0061047 A1 | 3/2013 | Sridharan et al. |
| 2013/0073702 A1 | 3/2013 | Umbehocker |
| 2013/0073743 A1 | 3/2013 | Ramasamy et al. |
| 2013/0125122 A1 | 5/2013 | Hansen |
| 2013/0125230 A1 | 5/2013 | Koponen et al. |
| 2013/0145106 A1 | 6/2013 | Kan |
| 2013/0163594 A1 | 6/2013 | Sharma et al. |
| 2013/0227097 A1 | 8/2013 | Yasuda et al. |
| 2013/0227550 A1 | 8/2013 | Weinstein et al. |
| 2013/0265883 A1 | 10/2013 | Henry et al. |
| 2013/0311663 A1 | 11/2013 | Kamath et al. |
| 2013/0318219 A1 | 11/2013 | Kancherla |
| 2013/0318268 A1 | 11/2013 | Dalal et al. |
| 2013/0332983 A1 | 12/2013 | Koorevaar et al. |
| 2013/0346583 A1 | 12/2013 | Low et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0068602 A1 | 3/2014 | Gember et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumitriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0281030 A1 | 9/2014 | Cui et al. |
| 2014/0282855 A1 | 9/2014 | Clark et al. |
| 2014/0330977 A1 | 11/2014 | Bemmel |
| 2014/0373148 A1 | 12/2014 | Nelms et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0082417 A1 | 3/2015 | Bhagwat et al. |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourlay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2015/0381494 A1* | 12/2015 | Cherian ............... H04L 69/22 370/392 |
| 2015/0381495 A1 | 12/2015 | Cherian et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0142320 A1 | 5/2016 | Gyllenhammer et al. |
| 2016/0156591 A1 | 6/2016 | Zhou et al. |
| 2016/0162302 A1 | 6/2016 | Warszawski et al. |
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | Deguillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0180249 A1 | 6/2017 | Shen et al. |
| 2017/0180273 A1 | 6/2017 | Daly et al. |
| 2017/0180414 A1 | 6/2017 | Andrews et al. |
| 2017/0180477 A1 | 6/2017 | Hashimoto |
| 2017/0187679 A1 | 6/2017 | Basak et al. |
| 2017/0195454 A1 | 7/2017 | Shieh |
| 2017/0208100 A1 | 7/2017 | Lian et al. |

(56) References Cited

U.S. PATENT DOCUMENTS

| | | |
|---|---|---|
| 2017/0214549 A1 | 7/2017 | Yoshino et al. |
| 2017/0244671 A1 | 8/2017 | Kamalakantha et al. |
| 2017/0244673 A1 | 8/2017 | Han |
| 2017/0244674 A1 | 8/2017 | Han |
| 2017/0264622 A1 | 9/2017 | Cooper et al. |
| 2017/0295033 A1 | 10/2017 | Cherian et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0097778 A1 | 4/2018 | Jain et al. |
| 2018/0109471 A1 | 4/2018 | Chang et al. |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0065526 A1 | 2/2019 | Ribeiro et al. |
| 2019/0075063 A1 | 3/2019 | McDonnell et al. |
| 2019/0132296 A1 | 5/2019 | Jiang et al. |
| 2019/0158396 A1 | 5/2019 | Yu et al. |
| 2019/0173689 A1 | 6/2019 | Cherian et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0176212 A1 | 6/2021 | Han |
| 2021/0194828 A1* | 6/2021 | He ................ H04L 47/33 |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0273911 A1 | 9/2021 | Jain et al. |
| 2021/0314232 A1 | 10/2021 | Nainar et al. |
| 2021/0357242 A1 | 11/2021 | Ballard et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0100546 A1 | 3/2022 | Cherian et al. |
| 2022/0103478 A1 | 3/2022 | Ang et al. |
| 2022/0103487 A1 | 3/2022 | Ang et al. |
| 2022/0103488 A1 | 3/2022 | Wang et al. |
| 2022/0103490 A1 | 3/2022 | Kim et al. |
| 2022/0103629 A1 | 3/2022 | Cherian et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0206962 A1 | 6/2022 | Kim et al. |
| 2022/0206964 A1 | 6/2022 | Kim et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2748750 A1 | 7/2014 |
| EP | B598291 A1 | 1/2020 |
| EP | 4127953 A1 | 2/2023 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2008095010 A1 | 8/2008 |
| WO | 2010008984 A2 | 1/2010 |
| WO | 2013074828 A1 | 5/2013 |
| WO | 2015187201 A1 | 12/2015 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Angeles, Sara, "Cloud vs. Data Center: What's the difference?" Nov. 23, 2018, 1 page, retrieved from https://www.businessnewsdaily.com/4982-cloud-vs-data-center.html.

Anwer, Muhammad Bilal, et al., "Building A Fast, Virtualized Data Plane with Programmable Hardware," Aug. 17, 2009, 8 pages, VISA'09, ACM, Barcelona, Spain.

Author Unknown, "8.6 Receive-Side Scaling (RSS)," Month Unknown 2020, 2 pages, Red Hat, Inc.

Author Unknown, "An Introduction to SmartNICs" The Next Platform, Mar. 4, 2019, 4 pages, retrieved from https://www.nextplatform.com/2019/03/04/an-introduction-to-smartnics/.

Author Unknown, "CISCO Identity-Based Firewall Security," Month Unknown 2011, 2 pages, CISCO Systems, Inc.

Author Unknown, "Hypervisor," Aug. 13, 2020, 1 page, VMware.com.

Author Unknown, "In-Hardware Storage Virtualization—NVMe SNAP™Revolutionizes Data Center Storage: Composable Storage Made Simple," Month Unknown 2019, 3 pages, Mellanox Technologies, Sunnyvale, CA, USA.

Author Unknown, "Middlebox," Wikipedia, Nov. 19, 2019, 1 page, Wikipedia.com.

(56) References Cited

OTHER PUBLICATIONS

Author Unknown, "Package Manager," Wikipedia, Sep. 8, 2020, 10 pages.
Author Unknown, "Transparent," Free On-Line Dictionary of Computing (FOLDOC), Jun. 6, 1996, 1 page, retrieved from http://foldoc.org/transparent.
Author Unknown, "VMDK", Wikipedia, May 17, 2020, 3 pages, retrieved from https://en.wikipedia.org/w/index.php?title=VMDK&oldid=957225521.
Author Unknown, "vSAN Planning and Deployment" Update 3, Aug. 20, 2019, 85 pages, VMware, Inc., Palo Alto, CA, USA.
Author Unknown, "vSphere Managed Inventory Objects," Aug. 3, 2020, 3 pages, retrieved from https://docs.vmware.com/en/VMware-vSphere/6.7/com.vmware.vsphere.vcenterhost.doc/GUID-4D4B3DF2-D033-4782-A030-3C3600DE5A7F.html, VMware, Inc.
Author Unknown, "What is End-to-End Encryption and How does it Work?," Mar. 7, 2018, 4 pages, Proton Technologies AG, Geneva, Switzerland.
Author Unknown, "AppLogic Features," Jul. 2007, 2 pages, 3TERA, Inc.
Author Unknown, "Enabling Service Chaining on Cisco Nexus 1000V Series," Month Unknown, 2012, 25 pages, CISCO.
Author Unknown, "Network Functions Virtualisation; Infrastructure Architecture; Architecture of the Hypervisor Domain," Draft ETSI GS NFV-INF 004 V0.3.1, May 28, 2014, 50 pages, France.
Author Unknown, "Next-Generation Firewalls," Month Unknown 2013, 1 page, Palo Alto Networks.
Basak, Debashis, et al., "Virtualizing Networking and Security in the Cloud," Month Unknown 2010, 9 pages, VMware, Inc., Palo Alto, CA.
Casado, Martin, et al., "Sane: a Protection Architecture for Enterprise Networks," Proceedings of the 15th USENIX Security Symposium, Jul. 31-Aug. 4, 2006, 15 pages, USENIX, Vancouver, Canada.
Dixon, Colin, et al., "An End to the Middle," Proceedings of the 12th Conference on Hot Topics in Operating Systems, May 2009, 5 pages, USENIX Association, Berkeley, CA, USA.
Doyle, Lee, "An Introduction to smart NICs and their Benefits," Jul. 2019, 2 pages, retrieved from https://www.techtarget.com/searchnetworking/tip/An-introduction-to-smart-NICs-and-ther-benefits.
Dumitriu, Dan Mihai, et al., (U.S. Appl. No. 61/514,990), filed Aug. 4, 2011, 31 pages.
Grant, Stewart, et al., "SmartNIC Performance Isolation with FairNIC: Programmable Networking for the Cloud," SIGCOMM '20, Aug. 10-14, 2020, 13 pages, ACM, Virtual Event, USA.
Guichard, J., et al., "Network Service Chaining Problem Statement," Network Working Group, Jun. 13, 2013, 14 pages, Cisco Systems, Inc.
Harris, Jim, "Accelerating NVME-oF* for VMs with the Storage Performance Development Kit," Flash Memory Summit, Aug. 2017, 18 pages, Intel Corporation, Santa Clara, CA.
Herbert, Tom, et al., "Scaling in the Linux Networking Stack," Jun. 2, 2020, 9 pages, retrieved from https://01.org/inuxgraphics/gfx-docs/drm/networking/scaling.html.
Ioannidis, Sotiris, et al., "Implementing a Distributed Firewall," CCS'00, Month Unknown 2000, 10 pages, ACM, Athens, Greece.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Koponen, Teemu, et al., "Network Virtualization in Multi-tenant Datacenters," Technical Report TR-2013-001E, Aug. 2013, 22 pages, VMware, Inc., Palo Alto, CA, USA.

Le Vasseur, Joshua, et al., "Standardized but Flexible I/O for Self-Virtualizing Devices," Month Unknown 2008, 7 pages.
Li, Junnan, et al., "DrawerPipe: a Reconfigurable Pipeline for Network Processing on FGPA-Based SmartNIC," Electronics 2020, Dec. 10, 2019, 24 pages, retrieved from https://www.mdpi.com/2079-9292/9/1/59.
Litvak, Michail, "Linux—IP-RULE(8): Routing Policy Database Management," Apr. 10, 2014, 5 pages, retrieved from https://man7.org/linux/man-pages/man8/ip-rule.8.html.
Liu, Ming, et al., "Offloading Distributed Applications onto SmartNICs using iPipe," SIGCOMM'19, Aug. 19-23, 2019, 16 pages, ACM, Beijing, China.
Mohammadkhan, Ali, et al., "P4NFV: P4 Enabled NFV Systems with SmartNICs," 2019 IEEE Conference on Network Function Virtualization and Software Defined Networks (NFV-SDN), Nov. 12-14, 2019, 7 pages, IEEE, Dallas, TX, USA.
Non-Published Commonly Owned U.S. Appl. No. 18/226,775, filed Jul. 27, 2023, 63 pages, Nicira, Inc.
Olds, Dan, "OS Virtualization vs. Hypervisor: Why You Should Offer Both," Oct. 19, 2008, 3 pages, techtarget.com.
Pagiamtzis, Kostas, et al., "Content-Addressable Memory (CAM) Circuits and Architectures: a Tutorial and Survey," IEEE Journal of Solid-State Circuits, Mar. 2006, 16 pages, vol. 41, No. 3.
PCT International Search Report and Written Opinion of Commonly Owned International Patent Application PCT/US2021/042115, mailed Dec. 2, 2021, 14 pages, International Searching Authority (EPO).
Perlroth, Nicole, "What is End-to-End Encryption? Another Bull's-Eye on Big Tech," The New York Times, Nov. 19, 2019, 4 pages, retrieved from https://nytimes.com/2019/11/19/technology/end-to-end-encryption.html.
Peterson, Larry L., et al., "OS Support for General-Purpose Routers," Month Unknown 1999, 6 pages, Department of Computer Science, Princeton University.
Pettit, Justin, et al., "Virtual Switching in an Era of Advanced Edges," In Proc. 2nd Workshop on Data Center-Converged and Virtual Ethernet Switching (DCCAVES), Sep. 2010, 7 pages, vol. 22. ITC.
Scarfone, Karen, et al., "Guidelines on Firewalls and Firewall Policy: Recommendations of the National Institute of Standards and Technology," Special Publication 800-41, Revision 1, Sep. 2009, 48 pages, NIST, U.S. Department of Commerce.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Spalink, Tammo, et al., "Building a Robust Software-Based Router Using Network Processors," Month Unknown 2001, 14 pages, ACM, Banff, Canada.
Stojanovski, Nenad, et al., "Analysis of Identity Based Firewall Systems," Jun. 2010, 9 pages.
Stojanovski, Nenad, et al., "Architecture Of A Identity Based Firewall System," Jul. 2011, 9 pages.
Stringer, Joe, et al., "OVS Hardware Offloads Discussion Panel," Nov. 7, 2016, 37 pages, retrieved from http://openvswitch.org/support/ovscon2016/7/1450-stringer.pdf.
Suarez, Julio, "Reduce TCO with Arm Based SmartNICs," Nov. 14, 2019, 12 pages, retrieved from https://community.arm.com/arm-community-blogs/b/architectures-and-processors-blog/posts/reduce-tco-with-arm-based-smartnics.

* cited by examiner

Flow Processing Table
943

| Matching Criteria 950<br>[SIP, SMAC, SPort, DIP, DMAC, DPort, Meta] | Action 960<br>[DROP, FWD, DECAP, ENCAP] |
|---|---|
| [IP1, MAC1, Port1, IP2, MAC2, Port2, VLAN1] | FWD VPID 1000  951 |
| [*, , Port3, IP3, MAC 3 , Port4, VLAN2] | FWD VPID 2225  952 |
| [IP4 /28, *, , IP5 /30, *, *, *] | DROP  953 |
| [IP6, *, Port6, IP7, MAC7, 4789, VXLAN2] | DECAP, FWD VPID 3189  954 |
| [IP8, MAC8, *, IP9, MAC9, *, , VPID 0001-0003] | FWD VPID 5472  955 |
| • • • | • • • |
| [*, , *, *, , *, *] | FWD VPID 5000  956 |

Mapping Table
942

| 970<br>VPID | 980<br>PPID | 990<br>Append VPID |
|---|---|---|
| 1000 | 9123 | 0  971 |
| 2225 | 1111 | 1  972 |
| 3189 | 8765 | 0  973 |
| • • • | • • • | • • • |
| 5000 | 1111 | 0  974 |
| *  976 | 1111 | 0  975 |
| | 986 | |

Flow Processing Offload Hardware
940

*Figure 9*

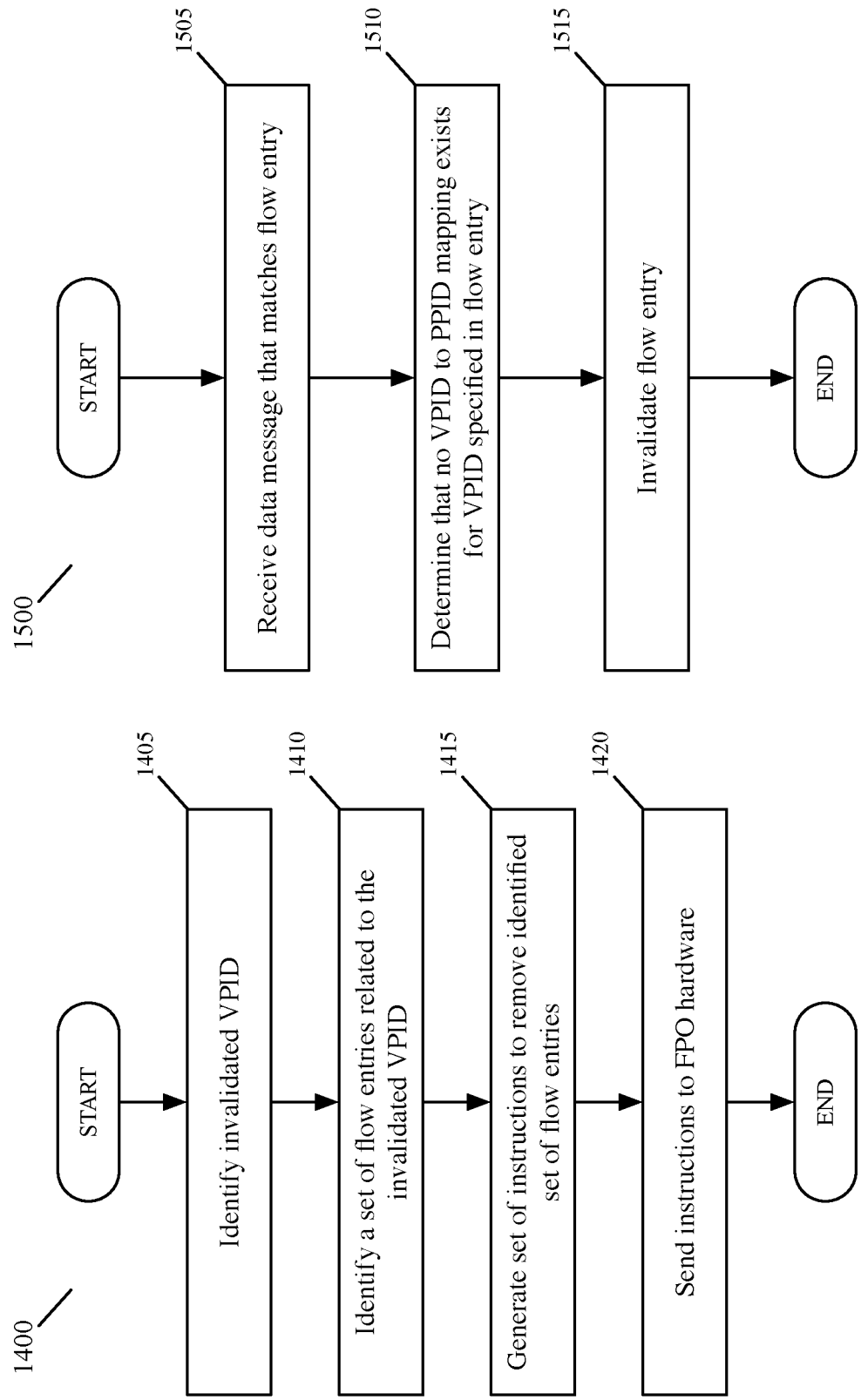

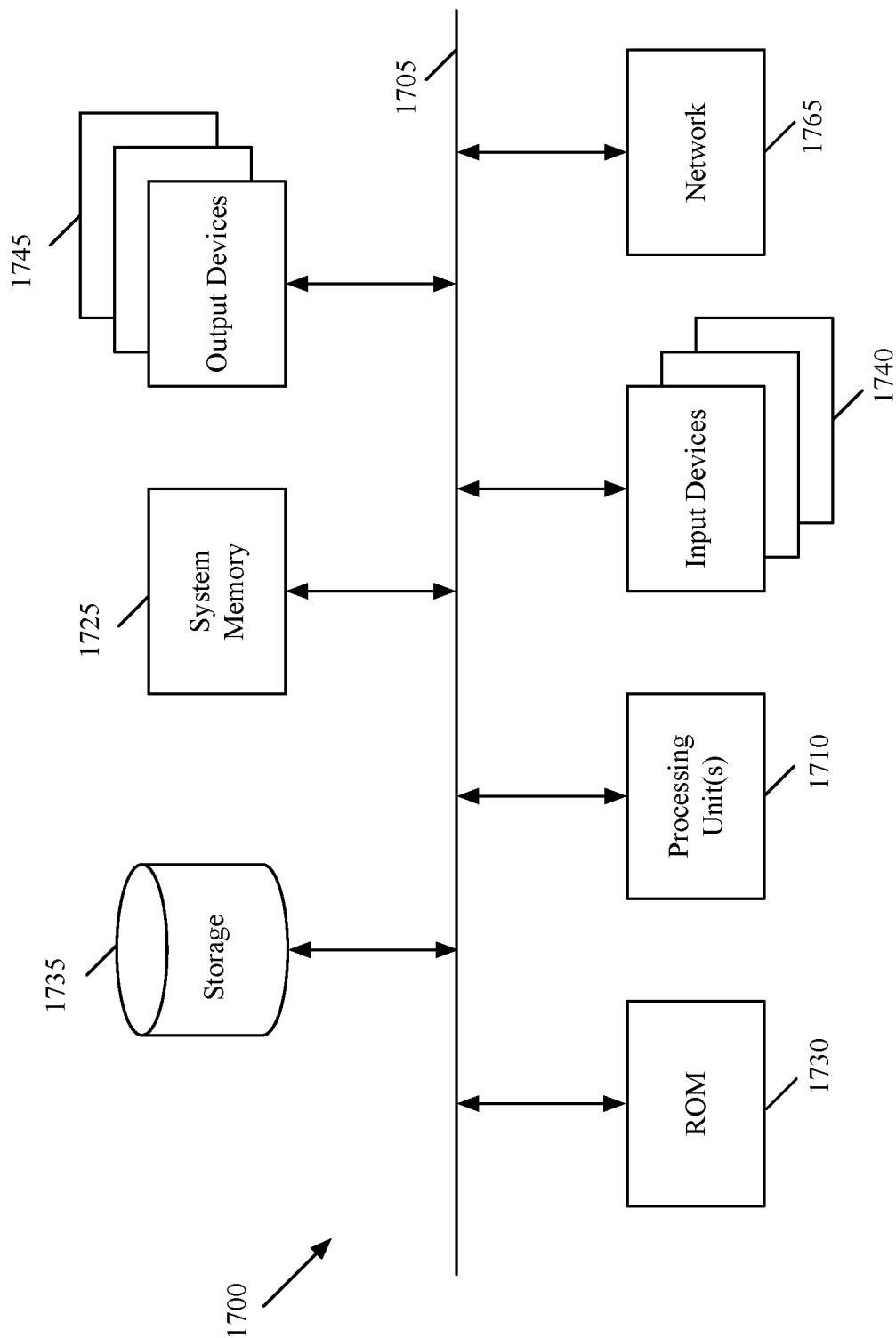

CONFIGURING PNIC TO PERFORM FLOW PROCESSING OFFLOAD USING VIRTUAL PORT IDENTIFIERS

CLAIM OF BENEFIT TO PRIOR APPLICATIONS

This application is a continuation application of U.S. patent application Ser. No. 17/114,994, filed Dec. 8, 2020, now published as U.S. Patent Publication 2022/0103487. U.S. patent application Ser. No. 17/114,994 claims the benefit of U.S. Provisional Patent Application 63/084,436, filed Sep. 28, 2020. U.S. patent application Ser. No. 17/114,994, now published as U.S. Patent Publication 2022/0103487, is incorporated herein by reference.

BACKGROUND

More operations normally associated with a server are being pushed to programmable network interface controllers (NICs). Some of the operations pushed to programmable NICs include flow processing for virtualized compute nodes. As these programmable NICs become more prevalent and perform more flow processing on behalf of virtualized networks, optimizations to the flow processing will enhance the functionality of programmable NICs. Accordingly, it is desirable to optimize the flow processing offloaded to a programmable NIC.

BRIEF SUMMARY

Some embodiments of the invention provide a method for configuring a physical network card or physical network controller (pNIC) to provide flow processing offload (FPO) for a host computer connected to the pNIC. The host computers host a set of compute nodes (e.g., virtual machines, Pods, containers, etc.) in a virtual network. The set of compute nodes are each associated with a set of interfaces (virtual NICs, ports, etc.) that are each assigned a locally-unique virtual port identifier (VPID) by a virtual network controller. The pNIC includes a set of interfaces (physical ports connected to a physical network, peripheral component interconnect express (PCIe) ports, physical functions (PFs), virtual functions (VFs), etc.) that are assigned physical port identifiers (PPIDs) by the pNIC. The method includes providing the pNIC with a set of mappings between VPIDs and PPIDs. The method also includes sending updates to the mappings as compute nodes migrate, connect to different interfaces of the pNIC, are assigned different VPIDs, etc. The method of some embodiments is performed by a flow processing and action generator. In some embodiments, the flow processing and action generator executes on processing units of the host computer, while in other embodiments, the flow processing and action generator executes on a set of processing units of a pNIC that includes flow processing hardware and a set of programmable processing units.

The method further includes providing the pNIC with a set of flow entries for a set of data message flows associated with the set of compute nodes. The set of flow entries, in some embodiments, define one or both of a set of matching criteria and an action using VPIDs. In some embodiments, the action specifies a destination. Each destination, in some embodiments, is specified in terms of a VPID and the pNIC resolves the VPID into a PPID (i.e., egress interface) using the set of mappings. Each flow entry, in some embodiments, is for a particular data message flow and is generated based on a first data message received in the data message flow. The flow entry is generated, in some embodiments, based on the result of data message processing performed by a virtual (e.g., software) switch and provided to the pNIC to allow the pNIC to process subsequent data messages in the data message flow.

In some embodiments, the pNIC stores the set of flow entries and the mappings in network processing hardware to perform flow processing for the set of compute nodes executing on the connected host computer. The flow entries and mapping tables, in some embodiments, are stored in separate memory caches (e.g., content-addressable memory (CAM), ternary CAM (TCAM), etc.) to perform fast lookups. In some embodiments, the pNIC receives data messages at an interface of the pNIC and performs a lookup in the set of flow entries stored by the network processing hardware to identify an action for the data message based on matching criteria associated with the data message. Flow entries, in some embodiments, include a set of criteria for identifying a data message flow and an action that specifies forwarding the data message to an interface identified by a VPID. If a flow entry specifying a VPID as a destination for a received data message exists, the pNIC performs a lookup in the VPID to PPID mappings to identify an interface of the pNIC associated with the VPID. The pNIC then forwards the data message to an interface of the pNIC identified by the PPID mapped to the specified destination VPID.

The network processing hardware, in some embodiments, is also programmed with a default flow entry that identifies an interface of the pNIC as a destination for data messages not matching with other flow entries. The identified interface, in some embodiments, is an interface used to forward the data message to a virtual (e.g., software) switch of the flow processing and action generator. The virtual switch, in some embodiments, performs first-data-message processing (e.g. slow path processing) and based on the result of the processing returns a flow entry to the network processing hardware for processing subsequent data messages in the data message flow to which the data message belongs.

Some embodiments provide a method for updating VPID to PPID mappings when a compute node connects to a different interface of the pNIC. Connecting to a different interface of the pNIC occurs, in some embodiments, due to a compute node being migrated to a different interface of the pNIC or even a different host computer that is connected to a different interface of the pNIC when the pNIC provides FPO for multiple host computers. In some embodiments, connecting to a different interface of the pNIC is based on a VM transitioning from a passthrough mode (e.g., connected to a VF) to an emulated mode (e.g., connected to a PF) or vice versa. In such cases, flow entries identifying the VPID of the compute-node interface as a destination are still valid even though the compute-node interface is now connected to a different pNIC interface (i.e., with a different PPID). Data messages matching those flow entries are directed to the pNIC interface currently connected to the compute-node interface based on a lookup in the mapping table identifying the updated mapping of the VPID to the PPID of the currently-connected pNIC interface.

The method, in some embodiments, also addresses cases in which the pNIC includes multiple physical ports (PPs) connected to a physical network for which link aggregation (e.g., LACP, trunking, bundling, teaming, etc.) is enabled. A mapping of a first VPID to a first PPID of a first PP connected to the physical network, in some embodiments, is updated to map the first VPID to a second PPID of a second PP connected to the physical network in the event of (1) a failure of the first PP or (2) an updated load balancing decision to direct the traffic associated with the VPID to the second PP instead of the first PP.

In some embodiments, an updated VPID to PPID is required for a compute-node interface that is assigned a new VPID after a change to the configuration of the compute-node interface even if the vNIC is still connected to the same interface of the pNIC. For any of the updated VPID to PPID mappings, the flow processing and action generator, in some embodiments, sends a set of instructions (e.g., two separate instructions or a single instruction to perform two actions) to remove the invalid VPID to PPID mapping and create a new VPID to PPID mapping for the updated association between a VPID and a PPID. Because the configuration of the compute-node interface has changed, some previous data message flows are no longer valid and any data messages matching flow entries for those data message flows are redirected to the virtual switch of the flow processing and action generator to evaluate based on the new configuration of the compute-node interface. In some embodiments, the redirection to the virtual switch is based on a lookup in the VPID to PPID mapping table returning a 'fault' (e.g., a null result or other result indicating that there is no entry for the VPID in the mapping table). In some embodiments, data messages that match a flow entry but fail to match a VPID to PPID mapping are forwarded to the flow processing and action generator along with an identifier for the flow entry that the data message matched in order to allow the flow processing and action generator to instruct the pNIC to remove the invalid flow entry (i.e., a flow entry pointing to a VPID that no longer exists) from the set of flow entries stored by the network processing hardware.

The flow processing and action generator, in some embodiments, stores information regarding flow entries generated for each VPID identified as a source destination VPID. When a VPID for a particular compute-node interface is invalidated (e.g., as described above) and a new configuration has taken effect, the flow processing and action generator can identify the flow entries associated with the invalidated VPID and instruct the pNIC to remove the identified flow entries from the set of flow entries stored by the network processing hardware. This process need not be performed before the configuration change can take effect and can be performed as a background process by the flow processing and action generator and the pNIC when processing capacity is available.

Removing the flow entries specifying the invalidated VPID as a destination allows the VPID to be reused without concern for old flows associated with the compute-node interface previously associated with the invalidated VPID being directed to the compute-node interface currently associated with the reused VPID. Additionally, the networking processing hardware, in some embodiments, performs a process for aging out flow entries that have not been used (i.e., no data messages matching the flow entry have been received) for a particular amount of time. Accordingly, in such embodiments, the VPIDs may be reused safely even without the flow processing and action generator instructing the pNIC to remove the invalidated flow entries after an amount of time based on the particular amount of time (e.g., the particular amount of time plus a timeout for previously active flows directed to the invalidated VPID). In some embodiments, the VPIDs are configured to have more bits than the PPIDs such that the VPID to PPID mapping is sparse (i.e., there are at least as many unused VPIDs as the number of possible PPIDs).

The mapping table, in some embodiments, is also used to identify VPIDs associated with PPIDs on which a data message is received. A data message received at a PPID is associated with the VPID to which the PPID maps, and the lookup in the set of flow entries is performed based on the VPID as well as a set of other matching criteria. For PPIDs that are associated with multiple VPIDs, e.g., a physical function (PF) of the pNIC connected to an interface of a virtual switch connected to multiple compute-node interfaces each with a different VPID, a data message received at the PF is already associated with a VPID to distinguish the traffic from different sources. Additionally, for VPIDs that map to the PPID identifying the PF connected to the virtual switch, some embodiments include an indication in the mapping table (e.g., a flag bit associated with the mapping entry) that the VPID should be included with the forwarded data message matching the mapping entry.

In some embodiments, the mapping table is not programmed with mappings for VPIDs that connect to a virtual switch, and the networking processing hardware is programmed to send any data messages that match a flow entry but fail to match an entry in the mapping table to the pNIC interface connected to the virtual switch (i.e., of the flow processing and action generator) along with the destination VPID specified in the matching flow entry. The virtual switch can then forward the data message based on the destination VPID or other matching criteria of the data message. The virtual switch, in some embodiments, includes a fast path processing pipeline based on stored flow entries as well as a slow path processing pipeline based on the configuration of the virtual network and the characteristics of a received data message.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all of the embodiments described by this document, a full review of the Summary, the Detailed Description, the Drawings, and the Claims is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 9 illustrates flow processing hardware of a pNIC storing a mapping table, and a flow processing table.

FIG. 14 conceptually illustrates a process for removing invalid flow entries as a background process that can be performed as resources are available.

FIG. 15 conceptually illustrates a process performed by FPO hardware to remove flow entries specifying invalidated VPIDs.

FIG. 17 conceptually illustrates a computer system with which some embodiments of the invention are implemented.

DETAILED DESCRIPTION

Figure 1:
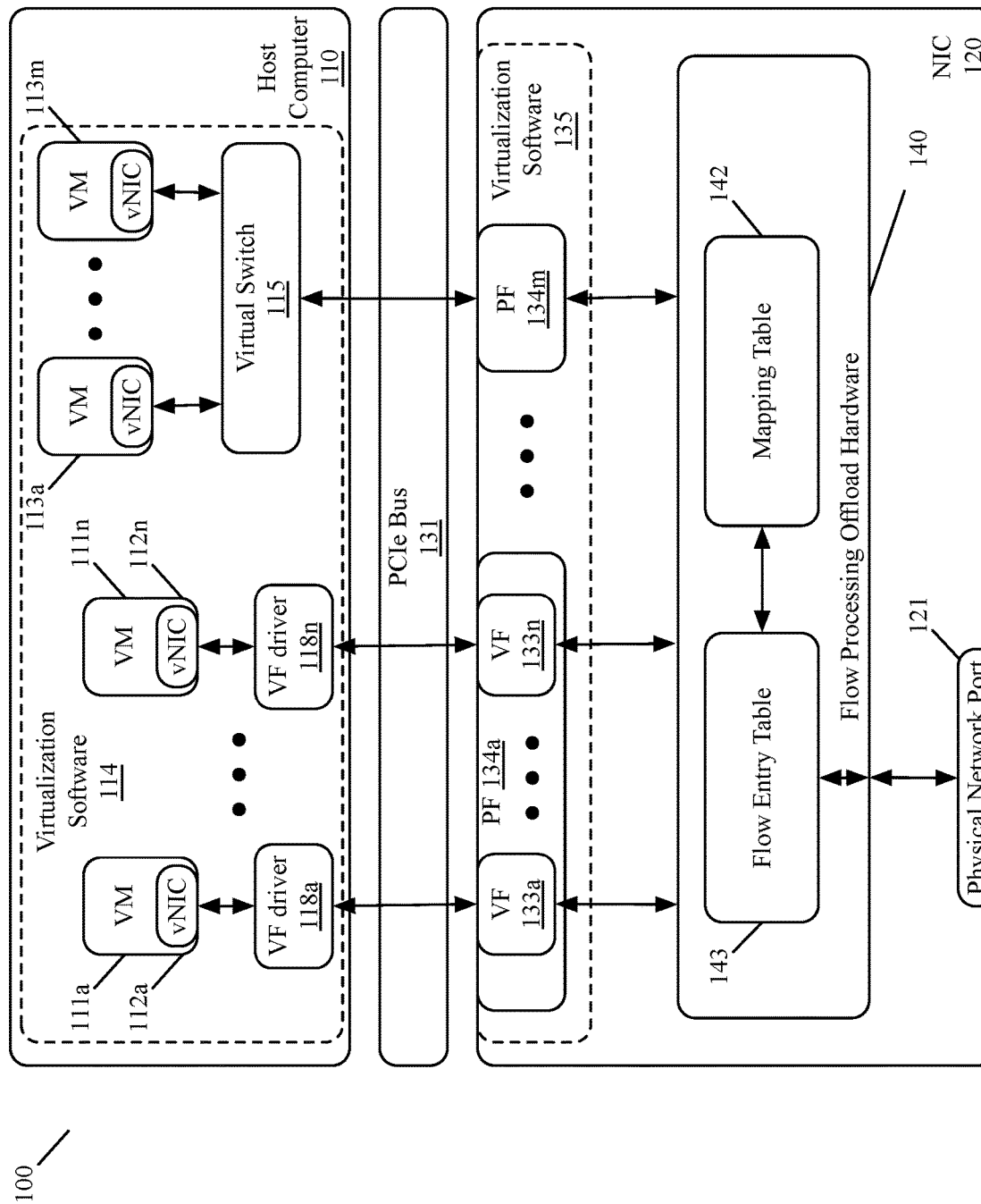
FIG. 1 illustrates an exemplary system configured to provide FPO for a host computer at a physical NIC.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for configuring a physical network card or physical network controller (pNIC) to provide flow processing offload (FPO) for a host computer connected to the pNIC. The host computers host a set of compute nodes (e.g., virtual machines (VMs), Pods, containers, etc.) in a virtual or logical network. The set of compute nodes are each associated with a set of interfaces (virtual NICs, ports, etc.) that are each assigned a locally-unique virtual port identifier (VPID) by a flow processing and action generator. The pNIC includes a set of interfaces (physical ports connected to a physical network, peripheral component interconnect express (PCIe) ports including physical functions (PFs) and virtual functions (VFs), etc.) that are assigned physical port identifiers (PPIDs) by the pNIC.

As used in this document, physical functions (PFs) and virtual functions (VFs) refer to ports exposed by a pNIC using a PCIe interface. A PF refers to an interface of the pNIC that is recognized as a unique resource with a separately configurable PCIe interface (e.g., separate from other PFs on a same pNIC). The VF refers to a virtualized interface that is not separately configurable and is not recognized as a unique PCIe resource. VFs are provided, in some embodiments, to provide a passthrough mechanism that allows compute nodes executing on a host computer to receive data messages from the pNIC without traversing a virtual switch of the host computer. The VFs, in some embodiments, are provided by virtualization software executing on the pNIC.

In some embodiments, the virtual network includes one or more logical networks including one or more logical forwarding elements, such as logical switches, routers, gateways, etc. In some embodiments, a logical forwarding element (LFE) is defined by configuring several physical forwarding elements (PFEs), some or all of which execute on host computers along with the deployed compute nodes (e.g., VMs, Pods, containers, etc.). The PFEs, in some embodiments, are configured to implement two or more LFEs to connect two or more different subsets of deployed compute nodes. The virtual network in some embodiments, is a software-defined network (SDN) such as that deployed by NSX-T™ and includes a set of SDN managers and SDN controllers. In some embodiments, the set of SDN managers manage the network elements and instruct the set of SDN controllers to configure the network elements to implement a desired forwarding behavior for the SDN. The set of SDN controllers, in some embodiments, interact with local controllers on host computers to configure the network elements. In some embodiments, these managers and controllers are the NSX-T managers and controllers licensed by VMware, Inc.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references, respectively, to the second data link layer, the third network layer, the fourth transport layer, and the seventh application layer of the OSI (Open System Interconnection) layer model.

FIG. 1 illustrates an exemplary system 100 configured to provide FPO for a host computer 110 at a physical NIC 120. Host computer 110 includes a first set of hosted virtual machines (VMs) 111a-n that connect to the pNIC 120 in a passthrough mode. In the embodiment illustrated in FIG. 1, each VM 111a-n has a virtual NIC (e.g., vNIC 112a-n) that connects to virtual functions (VFs) 133a-n of a physical function (PF) 134a of the pNIC 120 through a PCIe bus 131. The virtual machines (111a-n and 113a-m) and virtual switch 115 are shown executing within virtualization software 114. The VFs 133a-n are provided by a virtualization software 135. The virtualization software 135, in some embodiments, is a manufacturer virtualization software for providing single root I/O virtualization (SR-IOV) that enables efficient sharing of resources of a PCIe-connected device among compute nodes (e.g., VMs 111a-n). In other embodiments, the virtualization software 135 is a hypervisor program (e.g., ESX™ or ESXio™ that is specifically designed for virtualizing resources of a smart NIC).

In some embodiments, connections between the vNICs 112a-n and the VFs 133a-n is enabled by VF drivers 118a-n on the host computer 110. Host computer 110 also includes a second set of VMs 113a-m that connect to a virtual switch 115 of the host computer 110. The virtual switch 115 connects to the pNIC 120 through a PF 134m through the PCIe bus 131. In some embodiments, the PFs 134a-m are also virtualized by virtualization software 135 to appear as separate PCIe connected devices to the host computer 110 or a set of connected host devices. VMs and vNICs are just one example of a compute node and an interface that may be implemented in embodiments of the invention.

The pNIC 120 also includes a physical network port 121 that connects the pNIC 120 and the VMs 111a-n and vNICs 112a-n to a physical network. The PCIe bus 131 and physical network port 121 connect to the flow processing offload (FPO) hardware 140 to perform flow processing for the VMs 111a-n and vNICs 112a-n. The FPO hardware 140 includes a flow entry table 143 that stores a set of flow entries for performing flow processing. The flow entries, in some embodiments, specify a set of matching criteria and an action to take for data messages that match the matching criteria. One or both of the set of matching criteria and the action use VPIDs to identify compute-node interfaces. Additional matching criterion, in some embodiments, includes header values (e.g., header values related to L2, L3, L4, etc.) of the data message. In some embodiments, the possible actions include dropping the data message or forwarding the data message to a VPID.

The FPO hardware 140 also includes a mapping table 142. Mapping table 142 includes a set of VPID to PPID mappings that are used to resolve the VPIDs specified in flow entries into interfaces of the pNIC 120. The mapping table 142 maps VPIDs to PPIDs, and the PPIDs identify interfaces of the pNIC 120. In some embodiments, the PPIDs are assigned by the pNIC 120, and the VPIDs are assigned and associated with particular interfaces of the pNIC 120 by a flow processing and action generator (not shown). As will be discussed in the examples below, specifying the destinations in terms of VPIDs and using a mapping table to identify an interface of the pNIC allows flow entries to remain valid even as an interface of a compute node changes its association between one interface of the pNIC to an association with another interface of the pNIC.

Figure 2:
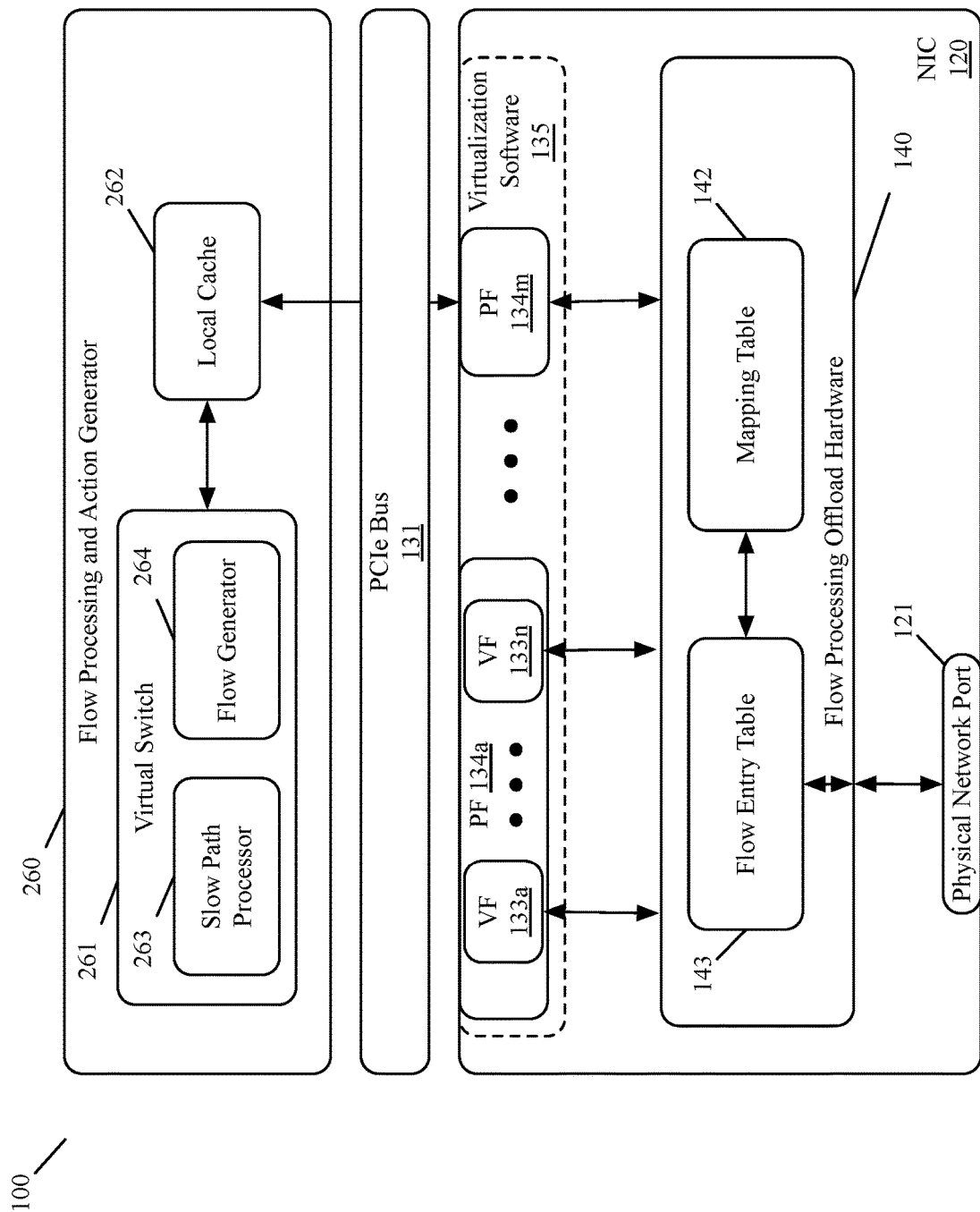
FIG. 2 illustrates the pNIC of FIG. 1 along with a flow processing and action generator (FPAG) that populates the mapping table and the flow entry table of FIG. 1.

FIG. 2 illustrates the pNIC 120 of FIG. 1 along with a flow processing and action generator (FPAG) 260 that populates the mapping table 142 and the flow entry table 143. In some embodiments, FPAG 260 replaces virtual switch 115 of FIG. 1 (e.g., the virtual switch 261 and local cache 262 are used to forward a data message in host computer 110). The FPAG 260 includes a local cache 262 that stores all of the generated flow entries, and for some data messages received at the FPAG 260 provides an action to the pNIC 120 to perform for the received data message. In some embodiments, the FPAG 260 executes on a host computer (e.g., host computer 110) and the local cache 262 functions as a fast path for data message processing that is not offloaded to the pNIC 120.

The FPAG 260 also includes a virtual switch 261, which in turn includes a slow path processor 263 and a flow generator 264. The slow path processor 263 performs slow path processing for data messages for which the FPO hardware 140 does not store a valid flow entry. The results of the slow path processing are then used by the flow generator 264 to generate a flow entry to offload the flow processing to the FPO hardware 140. For example, the slow path processing may indicate that a particular forwarding rule applies to the data message flow and supplies a set of criteria that uniquely identify the flow to which the data message belongs and an action to take for future data messages belonging to that flow. In some embodiments, for a particular forwarding rule that uses a reduced set of criteria, the generated flow entry includes wildcard values in the set of matching criteria specified by the flow entry for those data message characteristics that are not used by the particular forwarding rule to determine the action. FIG. 9 describes in more detail the types of criteria and actions that may be specified in a flow entry generated by flow generator 264.

Figure 3:
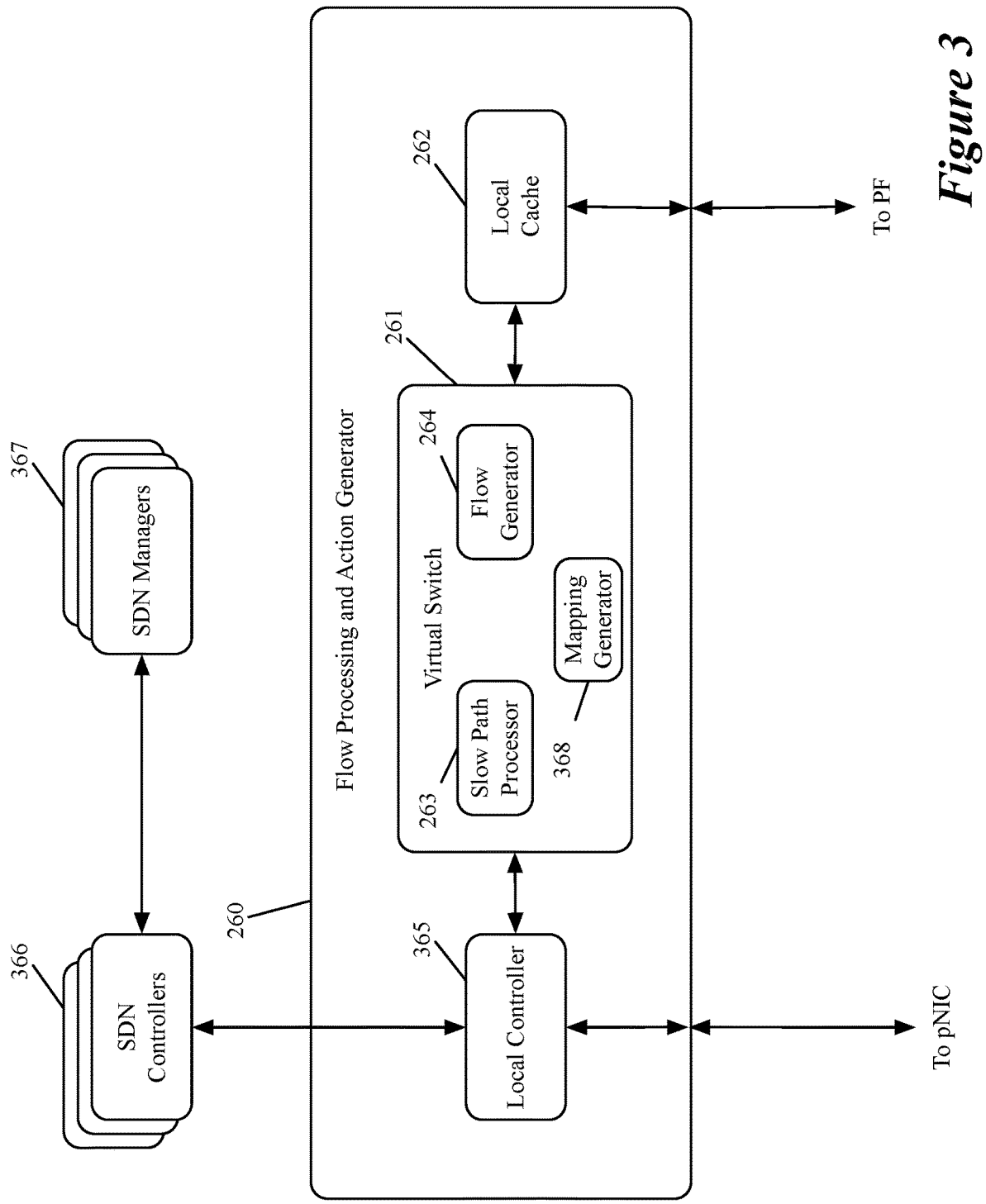
FIG. 3 illustrates a more detailed view of the FPAG that includes a mapping generator for generating the VPID to PPID mapping entries and a local controller that interacts with a set of SDN controllers and a set of SDN managers.

In some embodiments, the virtual network is a software-defined network (SDN) that includes a set of SDN managers and a set of SDN controllers. FIG. 3 illustrates a more detailed view of FPAG 260 that includes a mapping generator 368 for generating the VPID to PPID mapping entries and a local controller 365 that interacts with a set of SDN controllers 366 and a set of SDN managers 367. The local controller 365, in some embodiments, receives configuration information for locally-hosted compute nodes and managed switching elements (e.g., virtual switch 261). In some embodiments, the local controller 365 either receives VPIDs for compute-node interfaces from the set of SDN controllers 366, or assigns VPIDs to the compute-node interfaces locally. Additionally, the local controller 365, in some embodiments, interacts with the pNIC 120 to identify the PPIDs of the interfaces of the pNIC 120 and to configure the connections between the compute-node interfaces and the interfaces of the pNIC 120.

The local controller 365, in some embodiments, configures the slow path processor 263 with forwarding rules and additional policies (e.g., firewall policies, encryption policies, etc.) necessary to implement a data message processing pipeline defined for the SDN (or a set of logical forwarding elements of the SDN). The local controller 365, in some embodiments, also provides information received from the pNIC 120 and the SDN controllers 366 to the mapping generator 368 to identify the VPIDs and PPIDs of the different interfaces and the connections between the interfaces to generate VPID to PPID mappings. Additionally, the local controller 365 notifies the mapping generator 368 when a configuration change affects the VPID to PPID mappings to allow the mapping generator 368 to generate a new or updated VPID to PPID mapping and, when applicable, identify a mapping that must be deleted. While FPAG 260 is shown in FIGS. 2 and 3 as being separate from pNIC 120, in some embodiments discussed below, FPAG 260 is implemented on processing units of the pNIC 120.

Figure 4:
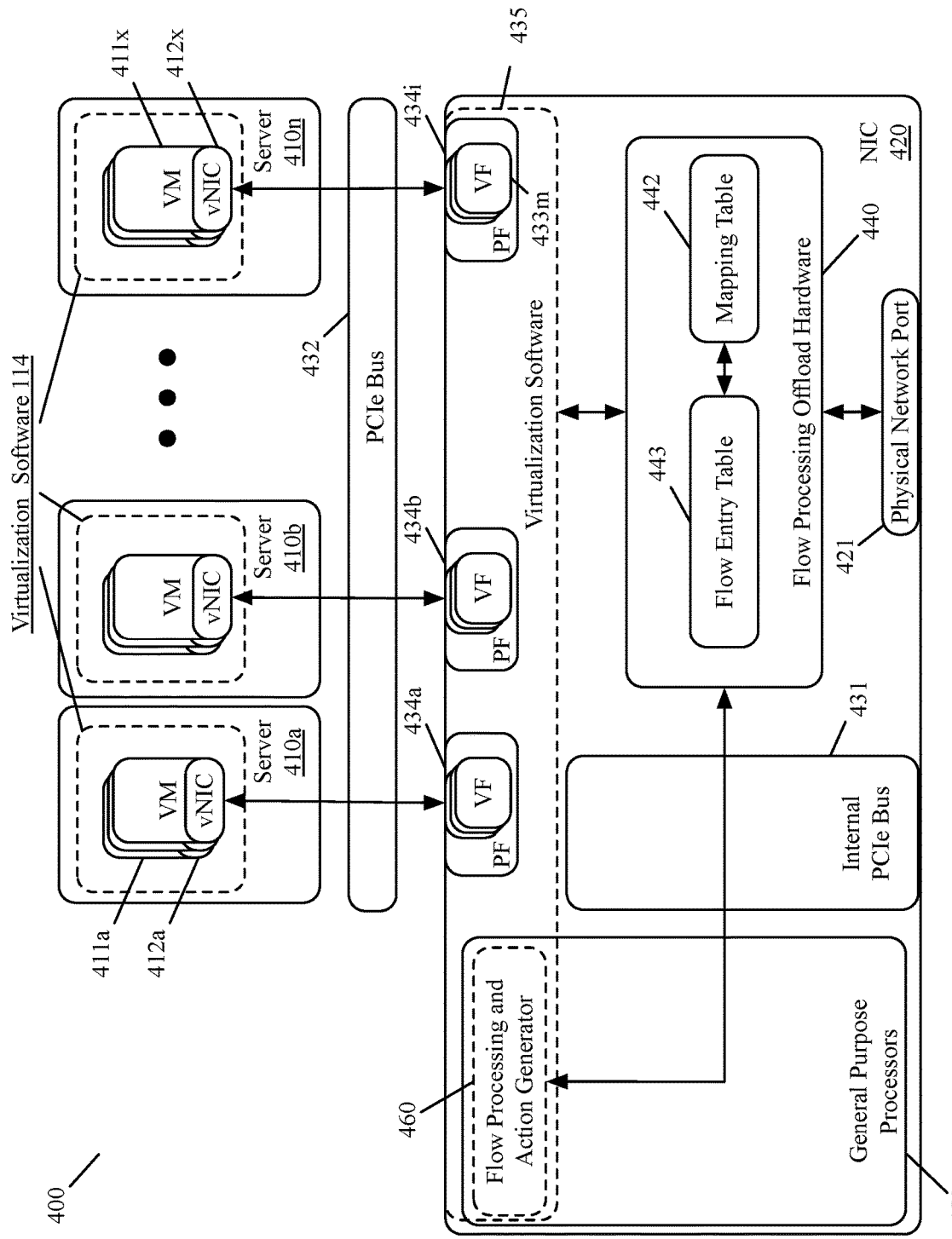
FIG. 4 illustrates a system in which the FPAG executes on a set of general purpose processors of the pNIC.

FIG. 4 illustrates a system 400 in which the FPAG 460 executes on a set of general purpose processors 450 of the pNIC 420. FIG. 4 also illustrates an embodiment in which the pNIC 420 connects, at a set of physical functions 434a-i through a PCIe bus 432, to multiple servers 410a-n each hosting a set of compute nodes (e.g., VMs 411a-x). In some embodiments, PCIe bus 432 is a set of separate PCIe buses for connecting to a set of host computers or peripheral devices, and the PFs 434a-i are physically separate interfaces that may or not be implemented as PFs for the separate PCIe buses. The FPAG 460 generates the flow entries for each of the servers 410a-n and communicates with other elements of the pNIC 420 using a separate internal PCIe bus 431 (in some embodiments through a physical function, not shown).

Figure 5:
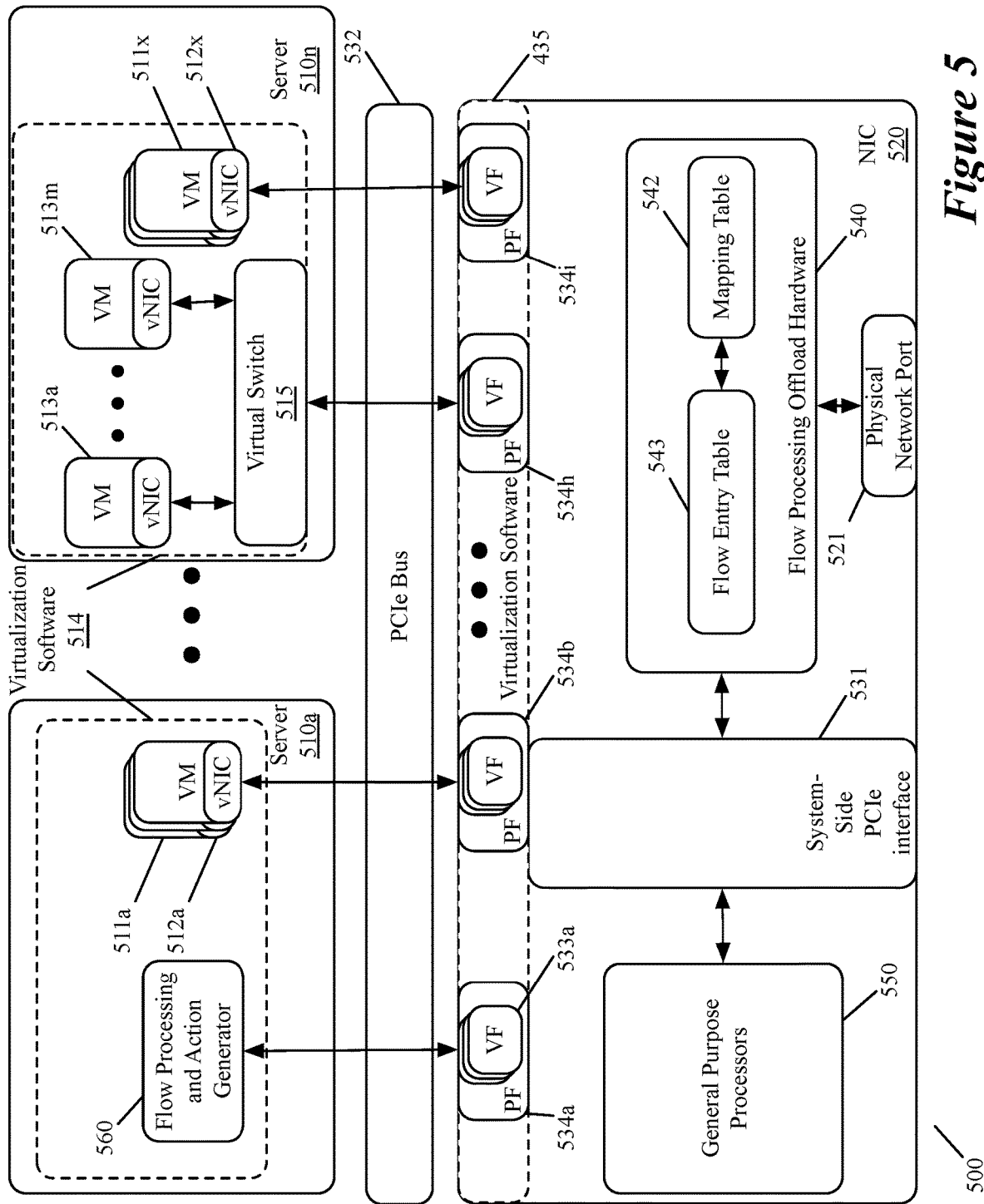
FIG. 5 illustrates a system in which the FPAG executes on one of multiple servers on behalf of all the servers connected to the pNIC.

FIG. 5 illustrates a system 500 in which the FPAG 560 executes on one server 510a of multiple servers 510a-n on behalf of all the servers 510a-n connected to the pNIC 520. FIG. 5 also illustrates that a server (e.g., server 510n) not executing the FPAG 560, in some embodiments, executes a virtual switch 515. Virtual switch 515, in some embodiments, is a lightweight virtual switch that implements forwarding decisions made by FPAG 560 and does not require a full network stack. Virtual switch 515, in some embodiments, connects to a set of emulated VMs 513*a-m* (e.g., VMs having vNICs not configured in passthrough mode).

Figure 6:
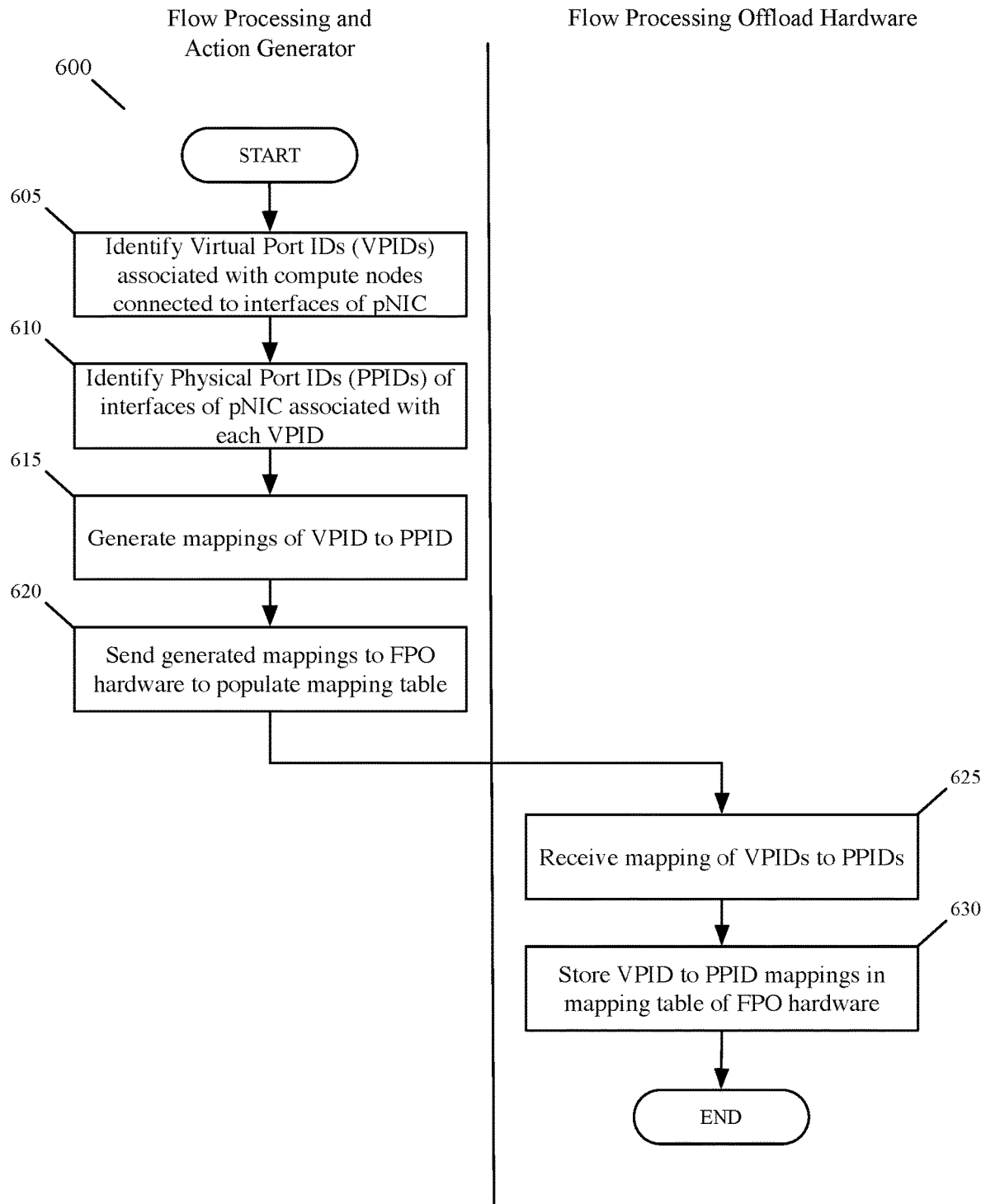
FIG. 6 conceptually illustrates a process performed in some embodiments to provide VPID to PPID mappings to be stored in a mapping table of the pNIC to perform flow processing.

The method includes providing the pNIC with a set of mappings between VPIDs and PPIDs. FIG. 6 conceptually illustrates a process 600 performed in some embodiments to provide VPID to PPID mappings to be stored in a mapping table of the pNIC to perform flow processing. Process 600, in some embodiments, is performed by a flow processing and action generator (e.g., by mapping generator 368) and the flow processing offload (FPO) hardware 140. In some embodiments, the flow processing and action generator is implemented on the pNIC while in other embodiments, the flow processing and action generator is implemented on a host computer connected to the pNIC. Process 600 begins by identifying (at 605) a set of VPIDs associated with compute nodes (e.g., VMs, Pods, containers, etc.) that are connected to the pNIC. The flow processing and action generator, in some embodiments, communicates with a set of network management computers that manage the virtual network to identify the set of compute nodes and VPIDs associated with the set of compute nodes.

The process 600 also identifies (at 610) interfaces of the pNIC connected to the identified compute-node interfaces and PPIDs associated with those pNIC interfaces. The PPIDs, in some embodiments, are identified by the flow processing and action generator by querying the pNIC for the PPIDs. In some embodiments, the flow processing and action generator is aware of all the interfaces of the pNIC and their PPIDs and determines the interface of the pNIC to which each compute-node interface connects.

Based on the identified VPIDs for the compute-node interfaces and the PPIDs of the interfaces of the pNIC to which they connect, the flow processing and action generator generates (at 615) a set of mappings between the VPIDs and PPIDs. The generated set of mappings is sent (at 620) to the FPO hardware of the pNIC. In some embodiments, the generated set of mappings is sent to the FPO hardware using a PF of a PCIe connection between the processing units that execute the flow processing and action generator and the FPO hardware. As described above, the processing units executing the flow processing and action generator are processing units of a host computer, while in other embodiments, the pNIC is an integrated NIC (e.g., a programmable NIC, smart NIC, etc.) that includes the processing units as well as the FPO hardware.

The FPO hardware receives (at 625) the VPID to PPID mappings sent from the flow processing and action generator. The received VPID to PPID mappings are stored (at 630) in a mapping table of the FPO hardware. In some embodiments, the mapping table is stored in a memory cache (e.g., content-addressable memory (CAM), ternary CAM (TCAM), etc.) that can be used to identify PPIDs based on VPIDs or VPIDs based on PPIDs. One of ordinary skill in the art will appreciate that the process 600 describes an initial mapping of VPIDs to PPIDs and that certain operations represent multiple operations or are performed in different orders (e.g., operation 605 may be preceded by operation 610) in different embodiments and that the description of process 600 is not meant to exclude equivalent processes for achieving the same result.

The method also includes sending updates to the mappings as compute nodes migrate, connect to different interfaces of the pNIC, are assigned different VPIDs, etc. One of ordinary skill in the art will appreciate that a modified process 600 for a particular VPID to PPID mapping, in some embodiments, is performed each time the flow processing and action generator detects a change to either a VPID or an association between a VPID and a PPID. For example, operation 605 identifies a specific set of VPIDs that are added, moved, or invalidated by a particular configuration change of the virtual network, and operation 610 identifies a current association of the added or moved set of VPIDs to a set of PPIDs of the pNIC. Generating (at 615) the mapping entries is performed only for the added or moved set of VPIDs mapped to the identified set of PPIDs. Additionally, sending (at 620) the generated mapping for an updated VPID to PPID mapping, in some embodiments, includes sending an instruction to remove a previously sent VPID to PPID mapping that is invalid based on the detected configuration change (invalidating a VPID or moving the VPID to connect to an interface identified by a different PPID).

The method further includes providing the pNIC with a set of flow entries for a set of data message flows associated with the set of compute nodes. The set of flow entries, in some embodiments, define one or both of a set of matching criteria and an action using VPIDs. In some embodiments, the action specifies a destination. Each destination, in some embodiments, is specified in terms of a VPID and the pNIC resolves the VPID into a PPID (i.e., egress interface) using the set of mappings. Each flow entry, in some embodiments, is for a particular data message flow and is generated based on a first data message received in the data message flow. The flow entry is generated, in some embodiments, based on the result of data message processing performed by a virtual (e.g., software) switch and provided to the pNIC to allow the pNIC to process subsequent data messages in the data message flow.

Figure 7:
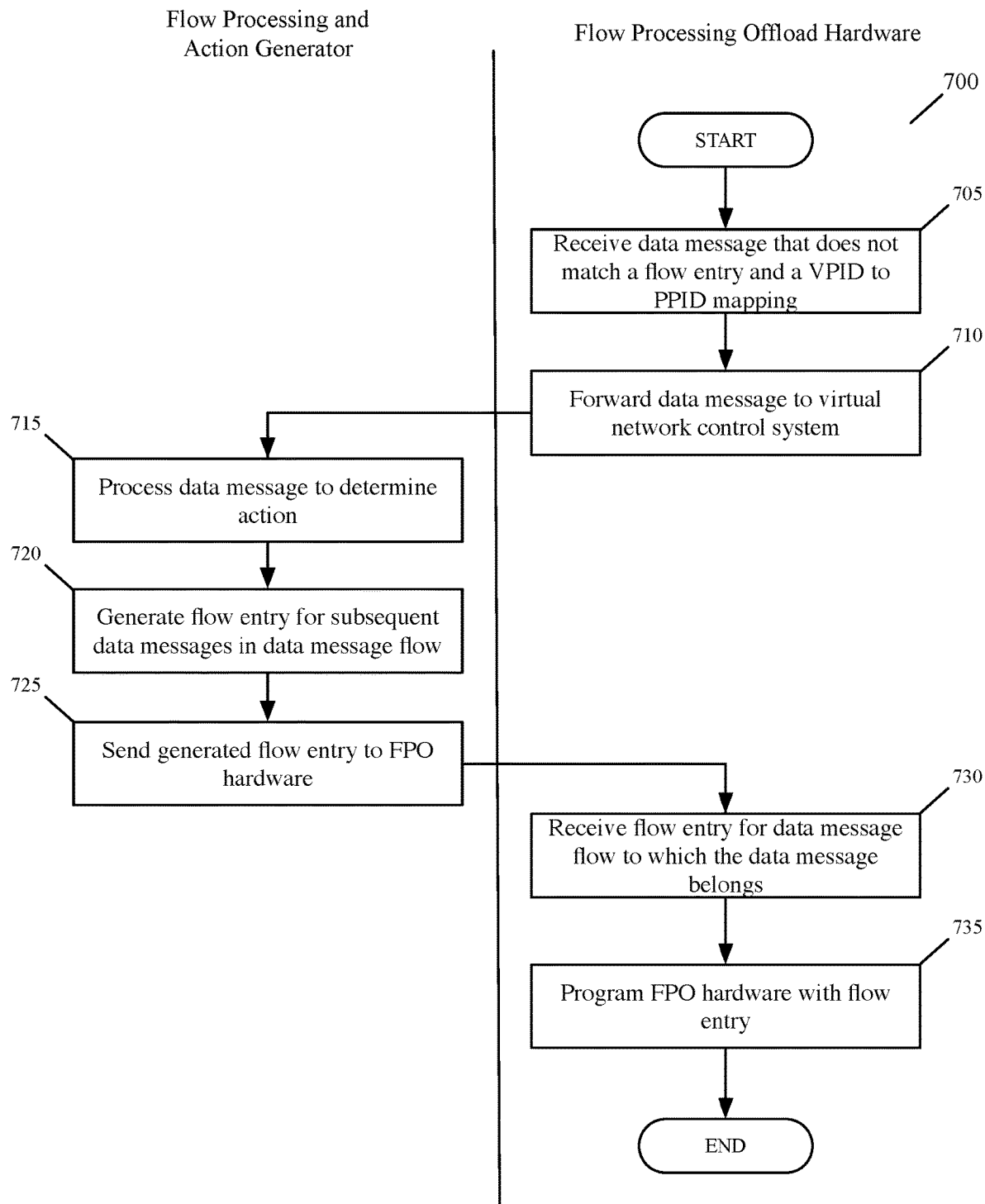
FIG. 7 conceptually illustrates a process for providing flow entries to the FPO hardware from a flow processing and action generator.

FIG. 7 conceptually illustrates a process 700 for providing flow entries to the FPO hardware from a flow processing and action generator. Process 700 begins by receiving (at 705) a data message at the FPO hardware that does not match both (1) a flow entry for the data message flow to which the data message belongs and (2) a VPID to PPID mapping stored by the FPO hardware. Alternatively, the data message may match only a default rule that identifies an interface connected to the flow processing and action generator as a destination for data messages that match the default rule. In some embodiments, the received data message is a first data message in a data message flow. The FPO hardware forwards (at 710) the data message to the flow processing and action generator (e.g., for slow path processing).

The flow processing and action generator processes (at 715) the data message through a processing pipeline to determine an action to take for subsequent data messages in the same data message flow. For example, the processing pipeline, in some embodiments, includes a set of logical forwarding operations along with a set of other operations (e.g., firewall, middlebox services, etc.) that result in either a decision to drop the data messages of the data message flow or identify a destination for data messages of the data message flow (possibly with an encapsulation or decapsulation before forwarding). Identifying the destination for data messages of a data message flow, in some embodiments, includes identifying a VPID of a compute-node interface that is a destination of the data messages of the data message flow.

Based on (1) characteristics of the received data message that identify the data message flow to which it belongs and (2) the action determined to be taken based on processing the data message, the flow processing and action generator generates (at 720) a flow entry for the FPO hardware to use to process subsequent data messages of the data message flow. The flow processing and action generator sends (at 725) the generated flow entry to the FPO hardware. As described above, in some embodiments, the generated flow entry is sent to the FPO hardware using a PF of a PCIe connection between the processing units that execute the flow processing and action generator and the FPO hardware.

The FPO hardware receives (at 730) the flow entry sent from the flow processing and action generator. The received flow entries are stored (at 735) in a set of flow entries (e.g., a flow entry table) of the FPO hardware. In some embodiments, the set of flow entries is stored in a memory cache (e.g., content-addressable memory (CAM), ternary CAM (TCAM), etc.) that can be used to identify a flow entry that specifies a set of matching criteria associated with a received data message.

Figure 8:
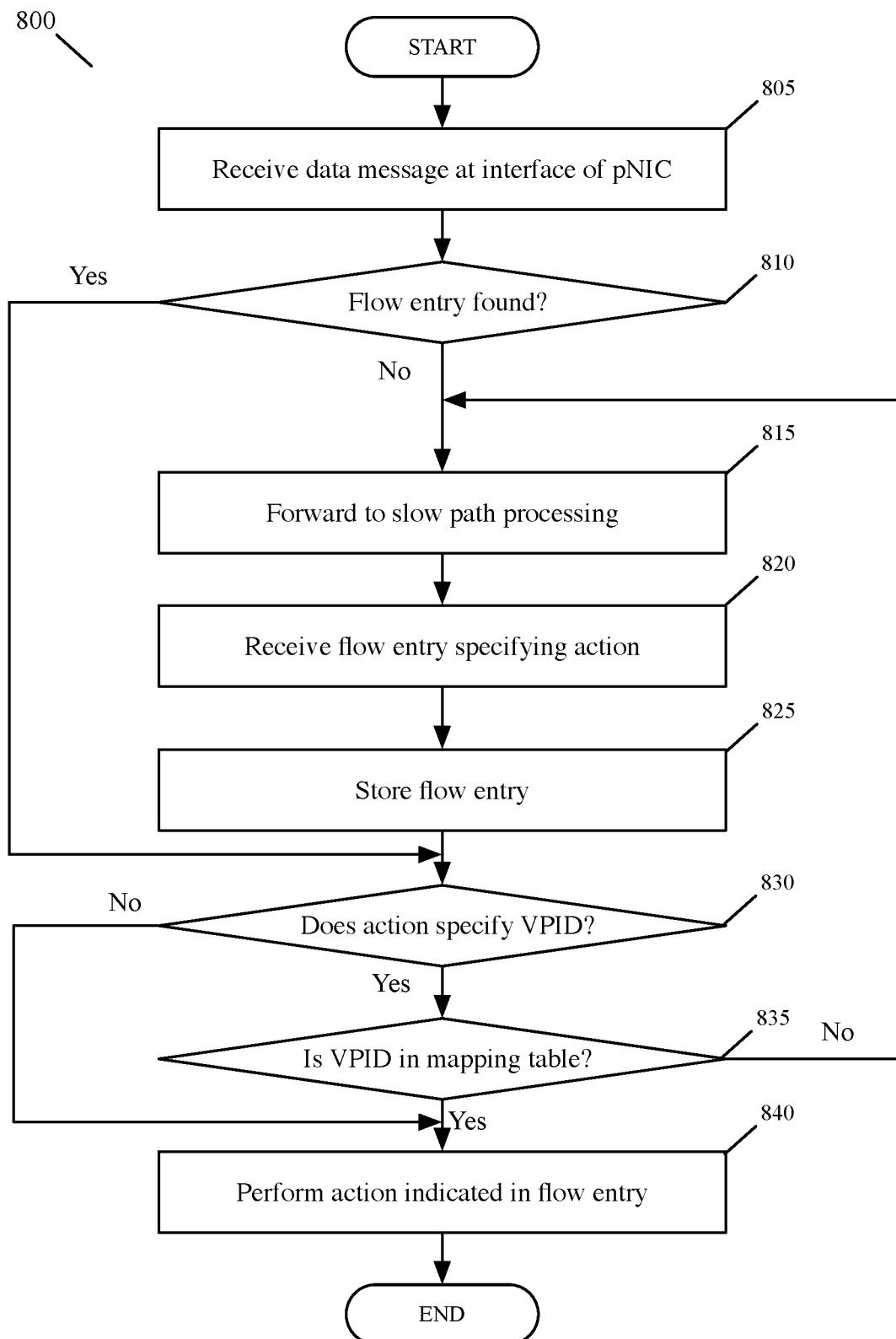
FIG. 8 conceptually illustrates a process for processing a data message received at the pNIC.

In some embodiments, the pNIC stores the set of flow entries and the mappings in network processing hardware to perform flow processing for the set of compute nodes executing on the connected host computer. The flow entries and mapping tables, in some embodiments, are stored in separate memory caches (e.g., content-addressable memory (CAM), ternary CAM (TCAM), etc.) to perform fast lookup. FIG. 8 conceptually illustrates a process 800 for processing a data message received at the pNIC. Process 800, in some embodiments, is performed by FPO hardware of a pNIC. Process 800 begins by receiving (at 805) a data message at an interface of the pNIC to be processed by the FPO hardware. The data message, in some embodiments, is one of a data message received at a physical port of the pNIC connected to a physical network and a data message received at an interface of the pNIC connected to the host computer.

The process 800 determines (at 810) if the received data message matches a flow entry stored by the FPO hardware. In some embodiments, determining whether the FPO hardware stores a flow entry matching the received data message is based on a lookup in a set of stored flow entries based on characteristics of the received data message (e.g., a 5-tuple, header values at different layers of the OSI model, metadata, etc.). If the received data message is determined (at 810) to not match a flow entry, the process 800 proceeds to forward (at 815) the data message to the flow processing and action generator for slow path processing, receive (at 820) a flow entry for the data message flow to which the received data message belongs, and store (at 825) the flow entry for processing subsequent data messages of the data message flow. Operations 815-825 are described in more detail above with the discussion of operations 710, 730, and 735 of FIG. 7 corresponding to operations 815-825.

If the received data message is determined to match a flow entry, the process 800 proceeds to determine (at 830) whether the matching flow entry specifies that data messages matching the flow entry be forwarded to a destination VPID. If the process 800 determines that the flow entry specifies that the data message be forwarded to a destination VPID, the process 800 determines (at 835) whether a mapping for the VPID exists in the mapping table. In some embodiments, determining whether a mapping for the VPID exists in the mapping table includes searching a content-addressable memory (CAM) based on the VPID. If the process 800 determines (at 830) that the flow entry does not specify a destination VPID (e.g., the flow entry specifies that the data message should be dropped) or the process 800 determines (at 835) that a mapping for the VPID exists in the mapping table, the action specified in the flow entry is performed (at 800) and the process ends.

If the process 800 determines (at 835) that the VPID is not in the mapping table, the process 800 returns to operations 815-825. In some embodiments, determining that the VPID is not in the mapping table 142 is based on the VPID lookup returning a default result that directs the data message to the interface associated with slow path processing (associated with operations 815-825). In other embodiments, instead of including a default entry in the mapping table 142, some embodiments determine that the VPID is not in the mapping table based on a VPID lookup returning a 'fault' (e.g., a null result or other result indicating that there is no entry for the VPID in the mapping table). In some embodiments, in which there is no default entry in the mapping table 142, the FPO hardware 140 is configured to direct all data messages for which a fault is returned to the virtual switch. As will be described below in reference to FIGS. 9 and 13 below, a flow entry may identify a VPID that is no longer valid in the case that a compute-node interface associated with the VPID is reconfigured and is assigned a new VPID.

FIG. 9 illustrates flow processing offload hardware 940 of a pNIC storing a mapping table 942, and a flow processing table 943. Flow processing table 943, in some embodiments, is stored in CAM and includes a set of flow entries 951-956 that specify a set of matching criteria 950 and an action 960. The set of matching criteria 950, in the illustrated embodiment, includes a source IP address (SIP), a source MAC (SMAC) address, a source port (SPort), a destination IP address (DIP), a destination MAC (DMAC) address, a destination port (DPort), and metadata. In some embodiments, the metadata is configurable by a user, or a type of metadata and a matching value for that type of metadata is identified in the set of matching criteria.

For example, flow entries 951 and 952 specify a VLAN identifier in the sets of matching criteria 950, while flow entry 954 specifies a VXLAN identifier in the set of matching criteria 950. In some embodiments, additional types of metadata that are added internally are also specified, such as in flow entry 955 which specifies a set of VPIDs (i.e., VPIDs 0001-0003) as a metadata criteria (characteristic) that is associated with a data message after a PPID identifying an interface of the pNIC on which the data message is received is translated into a VPID. VPIDs 0001-0003, in some embodiments, are associated with pNIC interfaces connecting to the physical network, such that flow entry 955 only applies to data messages received from the physical network.

In some embodiments, IP addresses are specified as classless inter-domain routing notation to identify an IP prefix representing a range of IP addresses (e.g., a range of IP addresses assigned to a particular application or user group that should or should not be granted access to a certain other application or user group). For example, flow entry 953 specifies a source IP range IP4/28 indicating an IP address "IP4" and a mask length of 28 bits such that any IP address matching the first 28 bits will be a match. Similarly, flow entry 953 specifies a destination IP range IP5/30 indicating an IP address "IP5" and a mask length of 30 bits such that any IP address matching the first 30 bits will be a match. Additionally, the flow entries, in some embodiments, include at least one criteria using a wildcard value (identified by "*") that is considered a match for any value of the associated characteristic of a received data message. For example, rules 952-956 all specify at least one criteria (e.g., data message characteristic) using a wildcard value.

In some embodiments, the flow entries are assigned priorities, such that, for a data message that matches multiple flow entries, an action specified in the flow entry with the highest priority is taken for the data message. Priority, in some embodiments, is determined by the specificity of the matching criteria of the flow entries when generating the flow entry during slow path processing and is included in the generated flow entry. A default rule 956 is specified, in some embodiments, that directs data messages that do not match any higher-priority rules to a VPID (e.g., VPID 5000) associated with slow path processing (e.g., to a virtual switch of the flow processing and action generator).

Each flow entry, in some embodiments, includes an action associated with a data message that matches that flow entry. The actions, in some embodiments, include: a forwarding operation (FWD), a DROP for packets that are not to be forwarded, modifying the packet's header and a set of modified headers, replicating the packet (along with a set of associated destinations), a decapsulation (DECAP) for encapsulated packets that require decapsulation before forwarding towards their destination, and an encapsulation (ENCAP) for packets that require encapsulation before forwarding towards their destination. In some embodiments, some actions specify a series of actions. For example, flow entry 954 specifies that a data message with source IP address "IP6," any source MAC address, a source port "Port6," a destination IP address "IP7," a destination MAC address "MAC7," a source port "4789," and metadata indicating that the data message is associated with a VXLAN "VXLAN2," be decapsulated and forwarded to VPID "3189." In some embodiments, the identified VPID is a VPID associated with a particular interface of a compute node executing on the host computer. The VPID identified by some flow entries that specify a DECAP action is a VPID for a physical function that connects to a virtual switch of the flow processing and action generator for processing the decapsulated data message through the slow path processing. For other flow entries that specify a DECAP action the interface identifier (e.g., VPID or PPID) is an identifier for a loopback interface of the FPO hardware to allow the FPO hardware to process the inner data message (the decapsulated data message). In some embodiments, flow entries specifying a DECAP action also explicitly specify further processing of the decapsulated data message by the FPO hardware.

Mapping table 942, in some embodiments, is stored in CAM and includes a set of VPID to PPID mappings 971-975 that specify a VPID in a "VPID" field 970, a corresponding PPID in a "PPID" field 980, and a flag bit indicating whether a VPID associated with a data message should be appended to a forwarded data message in an a "Append VPID" field 990. The mapping table, as described above in relation to FIGS. 1, 6, 7, and 8, is used to resolve VPIDs specified in flow entries into PPIDs associated with interfaces of the pNIC and, for some data messages received at interfaces of the pNIC, to resolve PPIDs into VPIDs. FIG. 9 illustrates that not every VPID specified in the set of flow entries has an entry in the mapping table. For example, VPID 5472 (specified in flow entry 955) does not have an entry in VPID field 970.

For VPIDs that are not found in the mapping table 942, some embodiments define a default entry 975 specifying a wildcard 976 in the VPID field 970. In the embodiment illustrated in FIG. 9, the default entry 975 is included in the mapping table 942 to direct data messages associated with invalid VPIDs to an interface of the pNIC associated with a particular PPID, in this case the PPID 986 ("1111") associated with the interface connected to the virtual switch of the flow processing and action generator. In some embodiments, a data message matching the default mapping table entry 975 that matched a non-default flow entry (e.g., 951-955) indicates an invalid VPID and flow entry. In other embodiments, instead of including a default entry in the mapping table 942, some embodiments define an action for VPID lookups returning a 'fault' (e.g., a null result or other result indicating that there is no entry for the VPID in the mapping table). For example, the action specifies that all data messages that match a flow entry but return a fault from the VPID lookup will be forwarded to the virtual switch and, in some embodiments, including (e.g., in metadata) an identifier of the matching flow entry specifying the invalid VPID.

In such cases, some embodiments include a flow entry identifier when forwarding the data message to the virtual switch of the flow processing and action generator. The flow entry identifier is stored in a metadata field or is appended to a data message in such a way to allow the flow processing and action generator to identify that the identified flow entry should be removed from the set of flow entries stored by the FPO hardware. The VPID may be invalid because an associated compute-node interface has changed configuration and been assigned a new VPID, or the associated compute node has been shut down. If the compute-node interface has been assigned a new VPID, the mapping table is provided with a mapping entry that maps the newly assigned VPID to a PPID of an associated interface of the pNIC and the flow entries associated with the invalid VPID will eventually be removed as described above and as further described in relation to FIGS. 14 and 15.

In some embodiments, multiple VPIDs are associated with a single PPID. For example mapping table entries 972, 974, and 975 are all associated with PPID 1111. In some embodiments, the append VPID field 990 is used to identify data messages for which the destination VPID should be forwarded along with the data message. As described above, PPID 1111 is associated with an interface of the pNIC connected to the virtual switch of the flow processing and action generator. The virtual switch, in some embodiments, provides a single connection to the pNIC for multiple emulated compute nodes and appending the VPID (e.g., VPID 2225) allows the virtual switch to use a local fast-path processing or other form of minimal processing to forward a data message associated with a VPID to its destination. Additionally, on the return path, the data message, in some embodiments, is associated with a VPID and the append VPID flag indicates that the VPID should not be removed before providing the data message to the FPO hardware 940. In other embodiments, VPIDs associated with data messages (e.g., stored in a metadata field of the data message) are kept by default. Appending (or keeping) the VPID on the return path allows the FPO hardware 940 to distinguish between the different compute nodes connected to the pNIC using the same interface.

Figure 10:
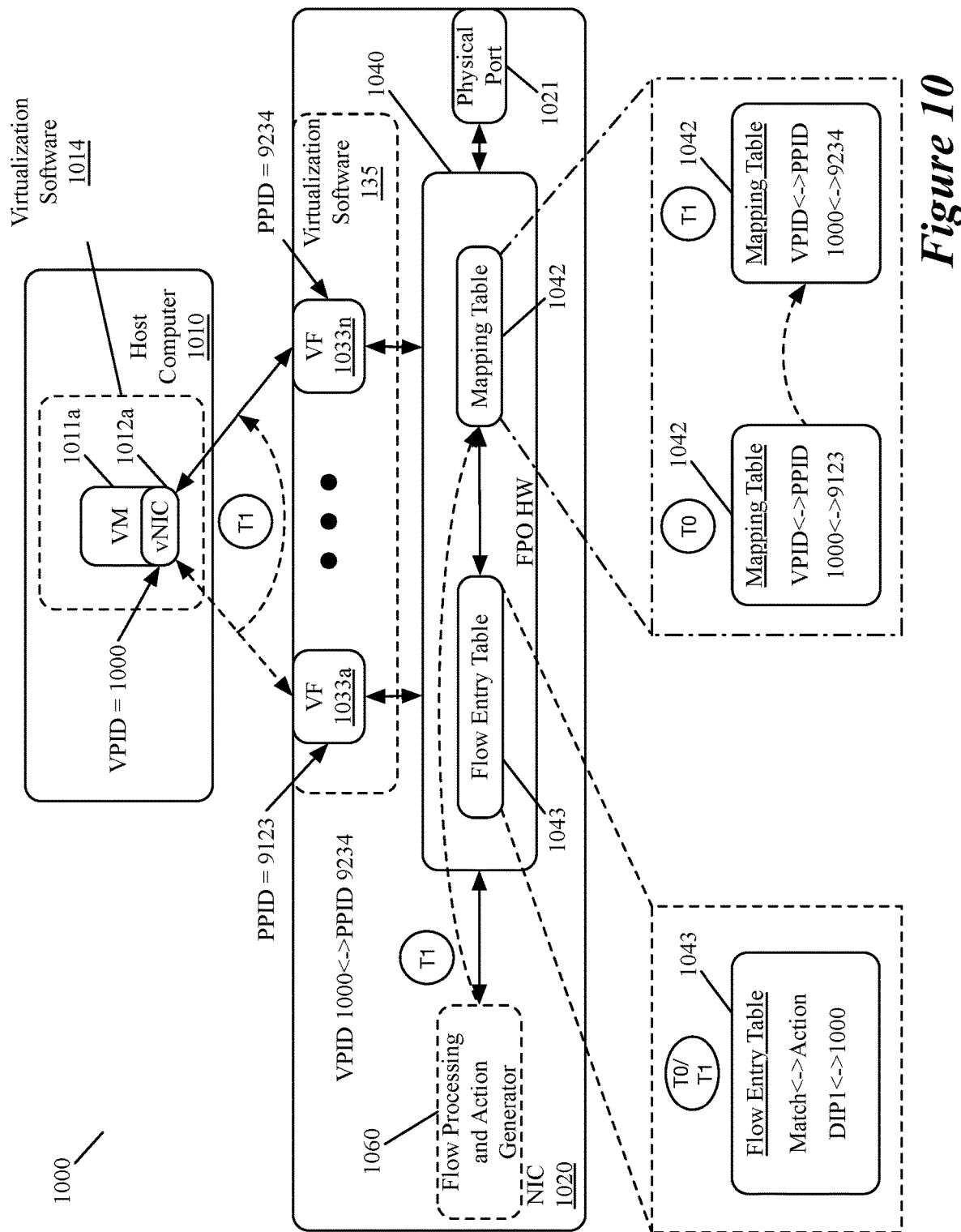
FIG. 10 illustrates a VM migration from one virtual function of the pNIC to another virtual function of the pNIC.

FIGS. 10-13 each illustrate a different type of VM configuration change and an update to a mapping table associated with the VM configuration change. Elements with similar numbering (e.g., 1010, 1110, and 1210) represent similar functional elements. FIG. 10 illustrates a VM 1011a 'migration' at a time "T1" from one virtual function 1033a of the pNIC 1020 to another virtual function 1033n of the pNIC 1020. In some embodiments, this 'migration' occurs because of a failure of the virtual function 1033a or for other reasons determined by a controller of the virtual network. Virtual function 1033a is identified by the PPID 9123 and virtual function 1033n is identified by the PPID 9234. At time T1, the vNIC 1012a of VM 1011a is disconnected from virtual function 1033a and connects to virtual function 1033n. Also at time T1 (or approximately at time T1) the FPAG 1060 sends an updated VPID to PPID mapping for VPID 1000 to associate it with PPID 9234 instead of PPID 9123. In other embodiments, the previous association between VPID 1000 and PPID 9123 is deleted and a new mapping between VPID 1000 and PPID 9234 is added by the FPAG 1060. As shown, flow entry table 1043 is the same at times T0 (before T1) and T1, while the mapping table 1042 is updated between times T0 and T1.

Figure 11:
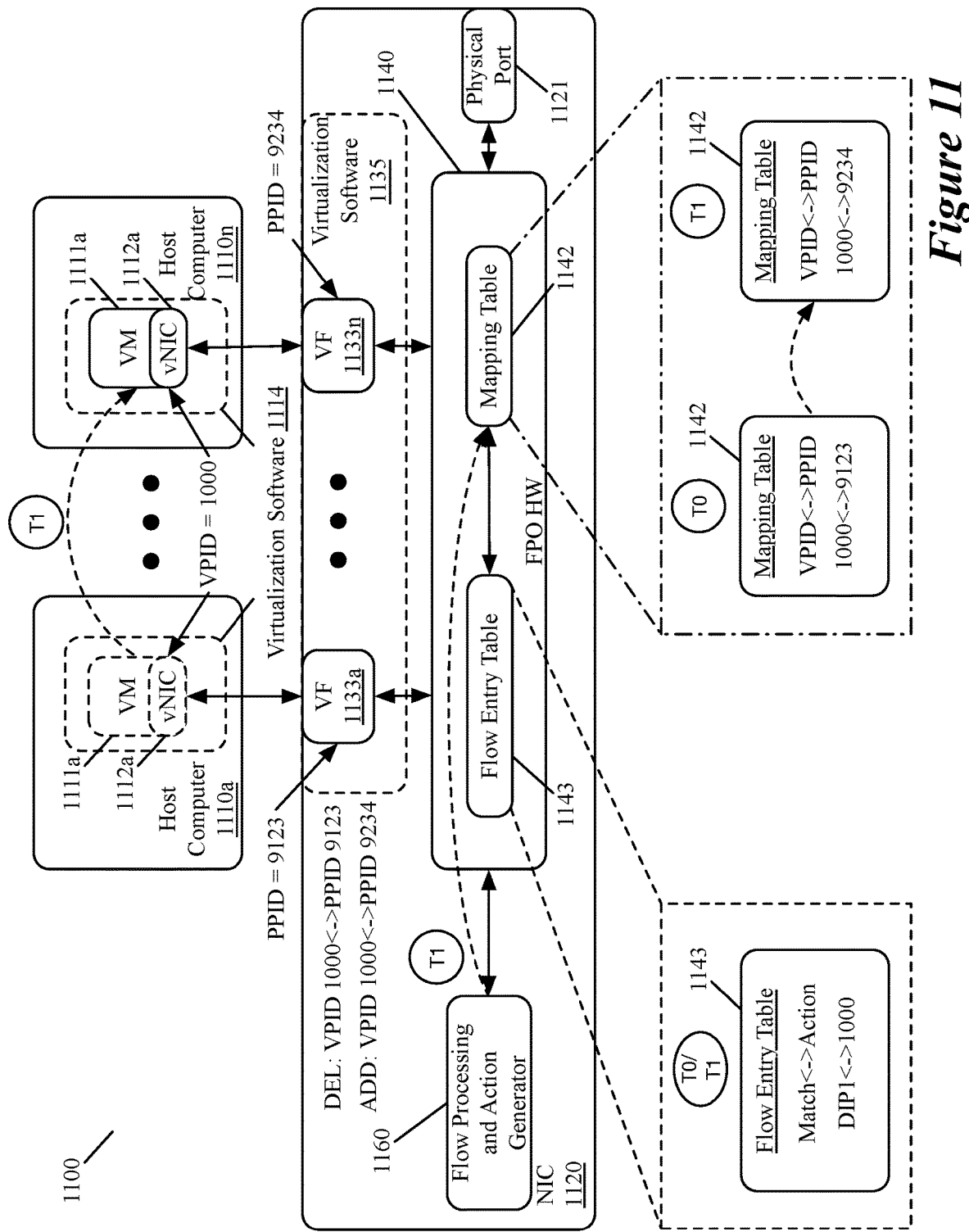
FIG. 11 illustrates a VM migration from one host computer connected to a virtual function of the pNIC to another host computer connected to a virtual function of the pNIC.

FIG. 11 illustrates a VM 1111a migration at a time "T1" from one host computer 1110a connected to virtual function 1133a of the pNIC 1120 to another host computer 1110n connected to virtual function 1133n of the pNIC 1120. Virtual function 1133a is identified by the PPID 9123 and virtual function 1133n is identified by the PPID 9234. At time T1, VM 1111a is shut down and disconnected from virtual function 1133a and migrates to host computer 1110n and connects to virtual function 1133n. Also at time T1 (or approximately at time T1) the FPAG 1160 sends a set of instructions for (1) deleting the previous VPID to PPID mapping and (2) adding a new VPID to PPID mapping for the new connection. As shown, flow entry table 1143 is the same at times T0 (before T1) and T1, while the mapping table 1142 is updated between times T0 and T1.

Figure 12:
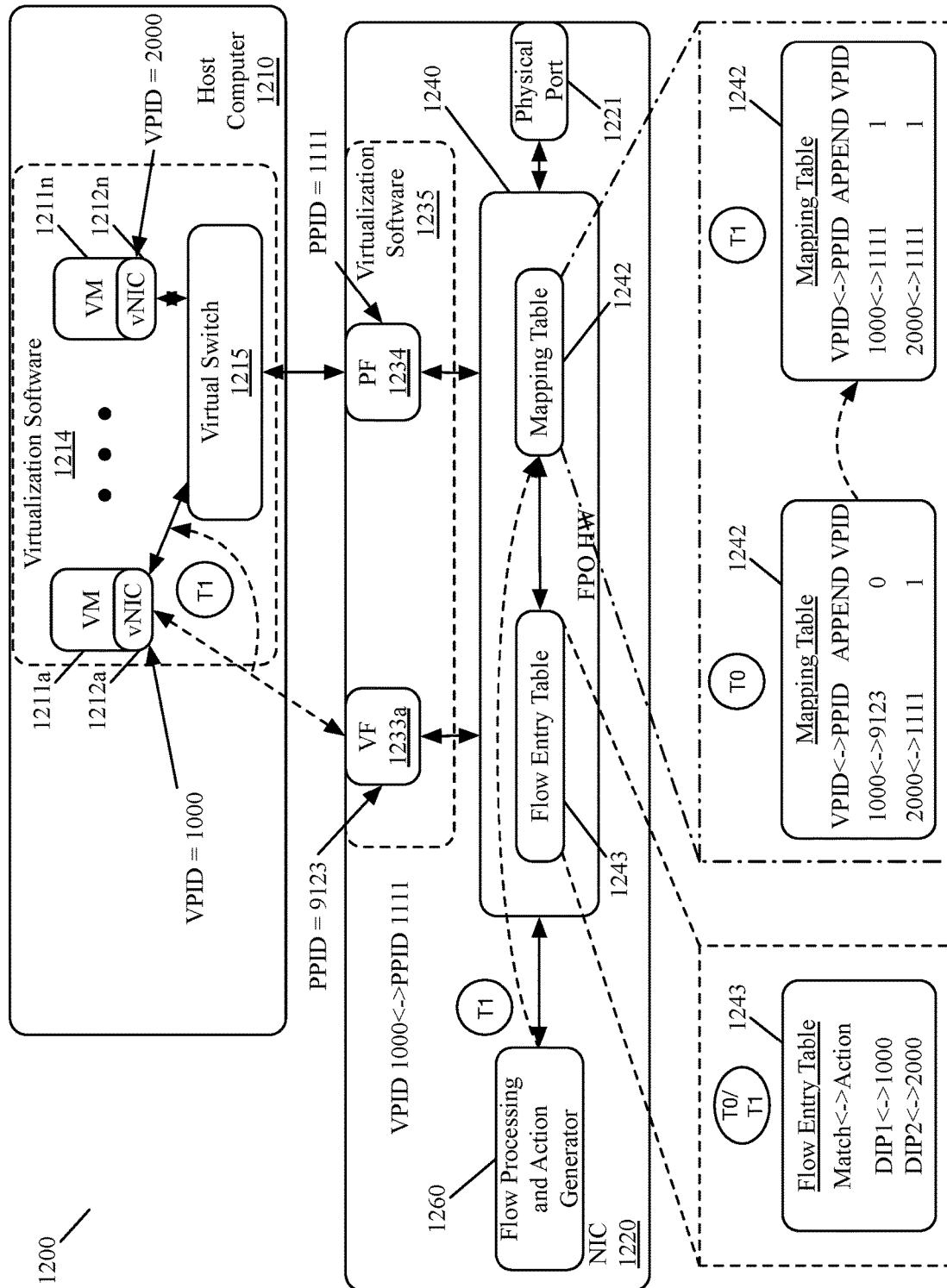
FIG. 12 illustrates a system including a VM transitioning at a time "T1" from a passthrough mode to an emulated mode.

FIG. 12 illustrates a system 1200 including a VM 1211a transitioning at a time "T1" from a passthrough mode to an emulated mode. A passthrough mode, in some embodiments, is a mode in which the vNIC 1212a is connected to a virtual function 1233a that allows direct communication between the pNIC 1220 and the VM 1211a, and an emulated mode is a mode in which the communication between the pNIC 1220 and the VM 1211a is through the virtual switch 1215. In some embodiments, virtual switch 1215 is a lightweight virtual switch that does not perform any slow path processing, but instead relies on the flow processing provided by either the FPO hardware or the FPAG 1260. Virtual switch 1215, connects, in the illustrated embodiment, to a physical function 1234. In some embodiments, a virtual switch connects to multiple compute nodes and connects to the pNIC through a physical function that (1) has a greater bandwidth than a virtual function and (2) has a greater configurability than a virtual function. Accordingly, the VPID to PPID mapping associates the PPID 1111 of the physical function 1234 with multiple VPIDs. At time T1, the vNIC 1212a of VM 1211a is disconnected from virtual function 1233a and connects to virtual switch 1215. Also at time T1 (or approximately at time T1) the FPAG 1260 sends an updated VPID to PPID mapping for VPID 1000 to associate it with PPID 1111 instead of PPID 9123. In other embodiments, the previous association between VPID 1000 and PPID 9123 is deleted and a new mapping between VPID 1000 and PPID 1111 is added by the FPAG 1260. Additionally, the VPID to PPID mapping is updated or replaced to change a value in the associated "Append VPID field" from "0" at time T0 to "1" at time T1 to indicate that the VPID associated with the vNIC 1212a should be maintained when forwarding data messages to the PF 1234 identified by PPID 1111. As shown, flow entry table 1243 is the same at times T0 (before T1) and T1, while the mapping table 1242 is updated between times T0 and T1.

Figure 13:
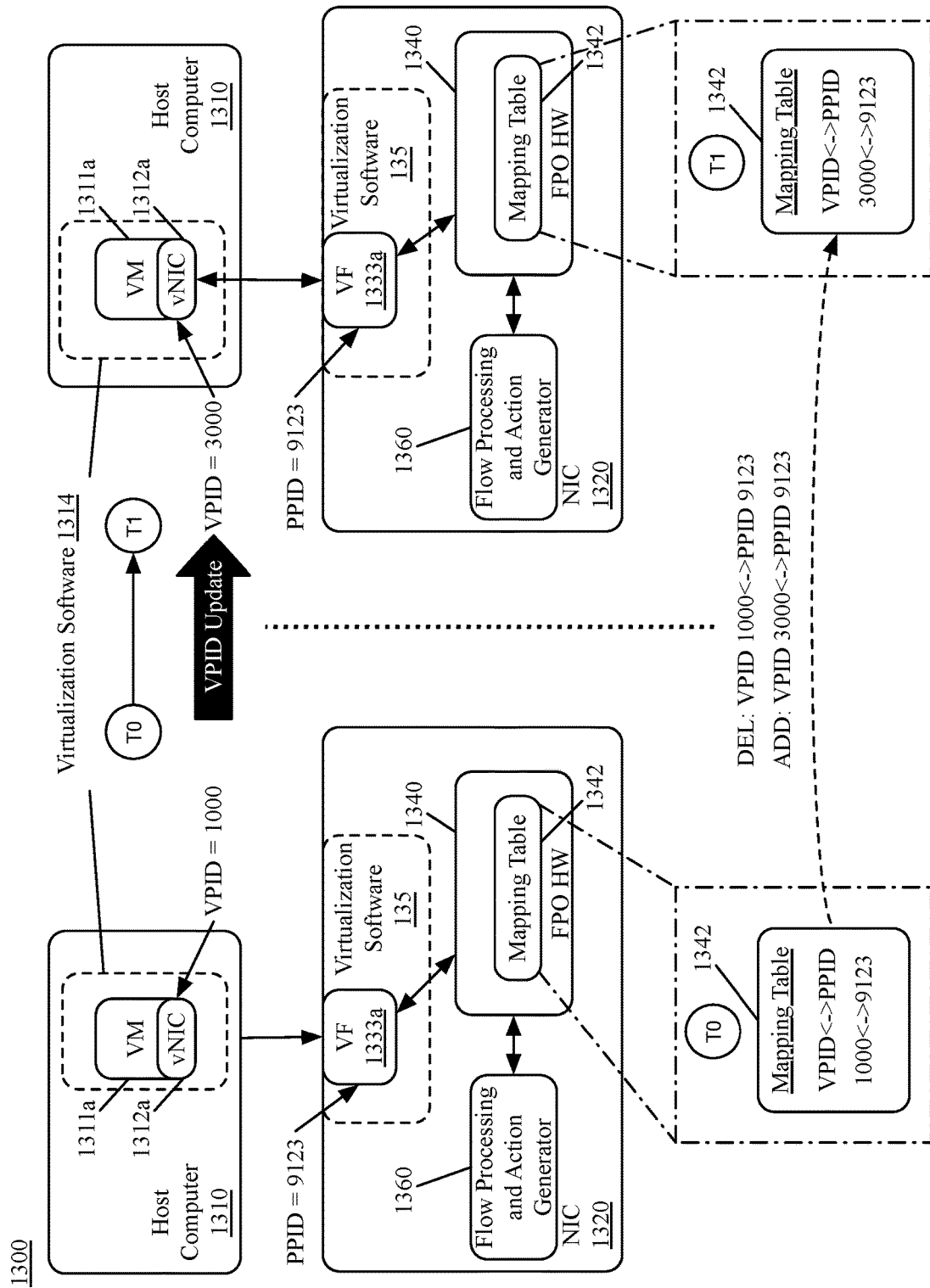
FIG. 13 illustrates selected elements of a system in which a change to a configuration of a vNIC of a VM causes the VPID of the vNIC to change.

FIG. 13 illustrates selected elements of a system 1300 in which a change to a configuration of a vNIC 1312a of VM 1311a at a time "T1" causes the VPID of the vNIC 1312a to change. The vNIC 1312a is connected to virtual function 1333a that is identified by the PPID 9123 both before and after the configuration change. At time T1, vNIC 1312a is reconfigured so that it is effectively a different vNIC and is assigned a new VPID 3000. Also at time T1 (or approximately at time T1) the FPAG 1360 sends a set of instructions for (1) deleting the previous VPID to PPID mapping and (2) adding a new VPID to PPID mapping for the new VPID. As shown, the mapping table 1342 is updated between times T0 and T1 to account for the newly assigned VPID. Mapping table lookups for flow entries specifying the previous VPID (i.e., VPID 1000) as a destination will now produce a fault (or hit a default mapping) and be directed to the FPAG 1360 as described in relation to FIG. 9 above.

FIGS. 10-12 all illustrate scenarios in which the VPID identifying a particular compute-node interface (i.e., vNICs 1012a, 1112a, and 1212a) remains the same throughout the transition or migration. In such cases, flow entries provided to the FPO hardware are still valid and by updating the VPID to PPID mapping table existing data message flows are directed to the current PPID (and the destination compute-node interface) without updating the individual flow entries or having to invalidate the existing flow entries before the change takes effect. However, in the scenario illustrated in FIG. 13, flow entries for existing flows are invalid (specify a destination VPID that no longer exists). The system treats all flow entries as invalid because the configuration change, in some embodiments and for some data message flows, does not allow or support certain existing data message flows and each data message flow must be revalidated. However, as in the scenarios for FIGS. 10-12, the changes to the compute-node interface and the VPID take effect without having to update or remove the flow entries.

FIG. 14 conceptually illustrates a process 1400 for removing invalid flow entries as a background process that can be performed as resources are available. Process 1400, in some embodiments, is performed by an FPAG. In some embodiments, process 1400 is performed based on information stored at the FPAG regarding flow entries generated by the FPAG for each VPID, and additionally or alternatively, based on information received from the FPO hardware. Process 1400 begins by identifying a VPID that has been invalidated (i.e., is no longer associated with a compute-node interface). In some embodiments, identifying the invalidated VPID is based on a notification from the local controller that the VPID is no longer associated with a compute-node interface (e.g., that the compute-node interface formerly associated with the VPID is now associated with a different VPID). In some embodiments, identifying the invalidated VPID includes receiving, from the FPO hardware, a data message that matched a flow entry but failed to match a VPID to PPID mapping. The data message received from the FPO hardware, in some embodiments, includes the invalidated VPID in metadata or sends a control message along with the data message to identify the invalidated VPID.

The process 1400 then identifies (at 1410) a set of flow entries related to the invalidated VPID. In some embodiments, the FPAG stores each flow entry generated specifying a VPID as either a source or destination. Based on the identified, invalidated VPID, the FPAG can identify each entry specifying the invalidated VPID as either a source or destination. In some embodiments, the FPAG does not identify all of the flow entries associated with the invalidated VPID, but instead identifies a flow entry related to the invalid VPID based on a data message received from the FPO hardware. The data message received from the FPO hardware, in some embodiments, includes (e.g., in metadata or as the content of a control message) a flow entry identifier for a flow entry matching a data message received at the FPO hardware that produced a fault (or hit a default rule) from a lookup in the mapping table. One of ordinary skill in the art will appreciate that operations 715-725 (of FIG. 7)

are also performed, in some embodiments, to generate a new flow entry for the received data message that produced a fault from the VPID lookup.

The process 1400 then generates (at 1415) a set of instructions to remove the identified flow entries from the FPO hardware. The set of instructions, in some embodiments, are generated as a single instruction to remove multiple flow entries, while in other embodiments, the set of instructions includes a separate instruction to remove each identified flow entry. In some embodiments, the set of instructions are generated as a background process when resources are available.

The set of instructions are sent (at 1420) to the FPO hardware to have the FPO hardware remove the flow entries from its storage. The FPO hardware then removes the invalidated flow entries and the process 1400 ends. In some embodiments, the FPO hardware also only processes the instructions as a background process that does not consume resources needed for other higher-priority processes. In some embodiments, the FPO hardware sends a confirmation that the identified set of flow entries have been removed to allow the FPAG to reuse the invalidated VPID. Process 1400 and processing the instructions at the FPO hardware are able to be performed as background processes because the configuration change can take effect based on the updated VPID to PPID mapping before the invalid flow entries are removed. The flow entries are removed to conserve resources of the FPO hardware and to enable invalidated VPIDs to be reused after flow entries previously generated for the VPID are removed.

FIG. 15 conceptually illustrates a process 1500 performed by FPO hardware to remove flow entries specifying invalidated VPIDs. Process 1500 begins by receiving (at 1505) a data message that matches a flow entry specifying an invalidated VPID as a destination. The data message may be a data message of an existing flow or of a new flow that matches the criteria of a flow entry that specifies wildcard values or ranges of values as matching criteria.

The process 1500 then determines (at 1510) that no VPID to PPID mapping exists for the VPID specified as a destination in the matching flow entry. The determination, in some embodiments, is based on a lookup in the mapping table producing a fault or a default mapping being the only match returned. In some embodiments, an identifier of the flow entry that matched the data message is maintained (e.g., forwarded along with the data message) until a non-default destination is identified.

The process 1500 then removes (at 1515) the flow entry from the FPO hardware. In some embodiments, the FPO hardware stores the flow entries along with a bit that indicates whether the flow entry should be automatically invalidated (e.g., deleted) if no non-default match is found in the mapping table. The FPO hardware, in some embodiments, automatically invalidates the flow entry that matched the data message either based on the bit stored along with the flow entry or as a default behavior that is not based on storing a flag bit along with the flow entry, and the process 1500 ends. In some embodiments, invalidating (at 1515) the flow entry includes sending a data message to the FPAG identifying the flow entry as being a flow entry that did not resolve into a destination PPID (i.e., did not produce a non-default match from a lookup in the mapping table). The FPGA then performs process 1400 to generate an instruction that is received by the FPO hardware to invalidate (or remove) the flow entry. Based on the received instruction, the FPO hardware invalidates (or removes) the flow entry and the process 1500 ends.

In some embodiments, the FPO also has an internal process for invalidating (e.g., aging out) flow entries based on the flow entry not having been used for a particular amount of time. The FPO hardware, in some such embodiments, stores data regarding the last time a flow entry matched a data message. If the time elapsed from the last time the flow entry matched a data message is greater than an aging-out threshold time, the flow entry is removed (or invalidated). Accordingly, after a reuse threshold time that is at least as great as the aging-out threshold time, an invalidated VPID can be reused. In some embodiments, the reuse threshold time is set to be equal to or greater than a time an average data message flow would timeout plus the aging-out time to ensure that the aging-out threshold has been met on the FPO hardware. To further facilitate the reuse of VPIDs, in some embodiments, the VPIDs are defined to have more bits than the PPIDs. The number of bits of the PPID, in some embodiments, is based on how many PFs the pNIC has and how many VFs each PF supports. Assuming a 16 bit PPID, a VPID, in some embodiments, is 18 or 20 bits depending on the desired sparsity of VPID to PPID mappings.

In some embodiments, the mapping table includes a set of reverse mappings to identify a VPID associated with a PPID on which a data message is received. The reverse mappings, in some embodiments, are generated using a process similar to process 600 but generates (at 615) mappings of PPIDs to VPIDs as well as VPIDs to PPIDs. The reverse mappings are stored in a separate reverse mapping table, in some embodiments. As discussed above, a particular PPID may be associated with multiple VPIDs. For data messages received from a compute node executing on a host computer, a VPID is appended (or maintained), when providing the data message to the FPO hardware.

Figure 16:
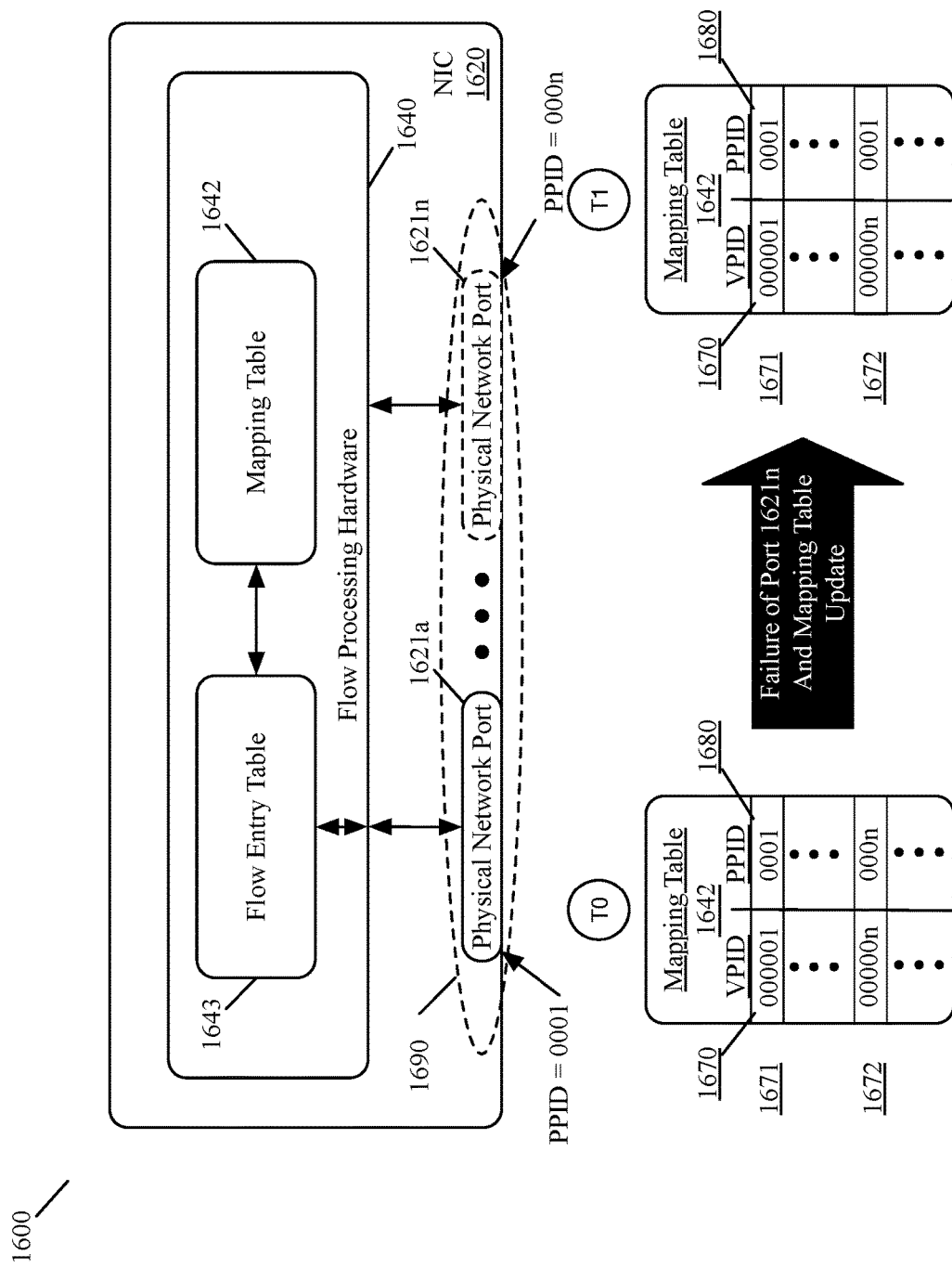
FIG. 16 illustrates a system in which link aggregation of physical network ports is enabled.

FIG. 16 illustrates a system 1600 in which link aggregation of physical network ports 1621a-n is enabled. In some embodiments, each physical network port 1621a-n is associated with a different VPID. As illustrated all the physical ports 1621a-n are included in link aggregation group 1690. In the case of a physical port failure, a VPID to PPID mapping can be updated so that the VPID associated with the failed physical port is associated to a functional physical port. FIG. 16 illustrates a mapping table 1642 before and after the failure of the physical port 1621n. The original mapping table 1642 at time T0 includes a mapping between VPID 00000n and PPID 000n after the failure of the physical port 1621n, the mapping table 1642 is updated at time T1 to include a new mapping of VPID 00000n to PPID 0001. This will allow data messages directed out of the pNIC 1620 to be sent out of the physical port 1621a without invalidating and rewriting any flow entries specifying VPID 00000n as a destination. As shown at T1 of FIG. 16, at least one physical port is associated with multiple VPIDs. In order to resolve the PPID to a particular VPID, some embodiments associate a priority with a set of VPID to PPID mappings such that the reverse mapping (from PPID to VPID) produces consistent results.

In addition to quickly failing over in the case of link failure without the need to rewrite flow entries associated with the failed link, the use of the mapping table also allows load balancing decisions made to distribute data messages over multiple physical ports to be updated without rewriting the associated flow entries. For example, if the bandwidth of a particular physical port in a link aggregation group changes, a set of data messages that was previously sent to the particular physical port, in some embodiments, is redirected to a different physical port by updating a VPID to PPID mapping so that a VPID associated with the particular physical port now maps to the PPID of the different physical port. In some embodiments, each physical port is assigned multiple VPIDs that map to the PPID of the physical port (e.g., physical port 1621a of FIG. 16 is mapped to at least two ports). A primary VPID is assigned to each particular physical port, in some embodiments, for reverse lookups and a set of secondary VPIDs is assigned that are each used for a portion of data-message traffic distributed (e.g., by the load balancing of the link aggregation protocol) for egress from the pNIC. The assigned VPIDs, in some embodiments, are used in a round robin fashion (or some other selection mechanism) as flow entries are generated for egress through the particular physical port. Using multiple VPIDs for each port, in some embodiments, allows for updated load balancing decisions to be made with finer granularity. For example, if 10 VPIDs are associated with a single physical port, each VPID could be remapped separately allowing a rebalancing of 10% of the data message load on the physical port instead of an all-or-nothing approach. One of ordinary skill in the art will understand that the number 10 is provided only as an example and that more or less VPIDs may be assigned to balance granularity of rebalancing with the complexities of generating flow entries specifying multiple VPIDs for a same destination physical port and updating multiple VPID to PPID mappings.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 17 conceptually illustrates a computer system 1700 with which some embodiments of the invention are implemented. The computer system 1700 can be used to implement any of the above-described hosts, controllers, and managers. As such, it can be used to execute any of the above-described processes. This computer system includes various types of non-transitory machine readable media and interfaces for various other types of machine readable media. Computer system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the computer system 1700. For instance, the bus 1705 communicatively connects the processing unit(s) 1710 with the read-only memory 1730, the system memory 1725, and the permanent storage device 1735.

From these various memory units, the processing unit(s) 1710 retrieve instructions to execute and data to process in order to execute the processes of the invention. The processing unit(s) may be a single processor or a multi-core processor in different embodiments. The read-only-memory (ROM) 1730 stores static data and instructions that are needed by the processing unit(s) 1710 and other modules of the computer system. The permanent storage device 1735, on the other hand, is a read-and-write memory device. This device is a non-volatile memory unit that stores instructions and data even when the computer system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such as random access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieve instructions to execute and data to process in order to execute the processes of some embodiments.

The bus 1705 also connects to the input and output devices 1740 and 1745. The input devices 1740 enable the user to communicate information and select requests to the computer system. The input devices 1740 include alphanumeric keyboards and pointing devices (also called "cursor control devices"). The output devices 1745 display images generated by the computer system 1700. The output devices 1745 include printers and display devices, such as cathode ray tubes (CRT) or liquid crystal displays (LCD). Some embodiments include devices such as touchscreens that function as both input and output devices.

Finally, as shown in FIG. 17, bus 1705 also couples computer system 1700 to a network 1765 through a network adapter (not shown). In this manner, the computer 1700 can be a part of a network of computers (such as a local area network ("LAN"), a wide area network ("WAN"), or an Intranet), or a network of networks (such as the Internet). Any or all components of computer system 1700 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Also, while several examples above refer to container Pods, other embodiments use containers outside of Pods. Thus, one of ordinary skill in the art would understand that the invention is not to be limited by the foregoing illustrative details, but rather is to be defined by the appended claims.

We claim:

1. A physical network interface card (PNIC) of a host computer executing a plurality of machines, the PNIC comprising:
   a plurality of interfaces;
   a flow processing offload (FPO) comprising:
      a mapping table storing a plurality of mappings with each mapping associating a virtual port identifier (VPID) of an interface of one machine executing on the host computer with a physical port identifier (PPID) of an interface of the PNIC;
      a flow entry table storing a plurality of flow entries, each flow entry in the plurality of flow entries associating a set of flow attributes with a VPID; and
      the FPO, for a received data message, (1) identifying a flow entry that specifies a VPID as a destination of the data message, and (2) using the identified VPID to identify a mapping in the mapping table that associates the identified VPID to a PPID of the PNIC interface that should be used as an egress interface of the PNIC for sending out the received data message.

2. The PNIC of claim 1, wherein the plurality of mappings between VPIDs and PPIDs is received at the PNIC from a flow processing and action generator that generates the mappings based on configuration data regarding VPIDs and PPIDs received by the flow processing and action generator.

3. The PNIC of claim 1, wherein the flow entries are received from the flow processing and action generator that processes a first data message in each data message flow to identifies a destination of the first data message, generates a flow entry based on the identified destination, and provides the flow entry for storing in the flow table for the data message flow for use for subsequent data messages of the data message flow.

4. The PNIC of claim 3, further comprising at least one processing unit for executing the flow processing and action generator.

5. The PNIC of claim 3, wherein the flow processing and action generator executes on one of said machines that executes on the host computer.

6. The PNIC of claim 1, wherein the mapping table is stored in a content addressable memory unit.

7. The PNIC of claim 1, wherein the flow entry is stored in a content addressable memory unit.

8. The PNIC of claim 1, wherein at least one PNIC interface is a physical function (PF) of a bus that is used to connect the PNIC to the host computer.

9. The PNIC of claim 8, wherein the PF connects to a software switch executing on the host computer.

10. The PNIC of claim 1, wherein at least one PNIC interface is a virtual function (VF) associated with a bus that is used to connect the PNIC to the host computer.

11. The PNIC of claim 10, wherein the VF communicates with an interface of one machine.

12. The PNIC of claim 11, wherein the VF communicates with the machine interface through a VF driver that executes on the host computer.

13. A method for processing flows on a host computer comprising a physical network interface card (PNIC) and a plurality of interfaces, and executing a plurality of machines, the method comprising:
   storing, in a mapping table of a flow processing offload (FPO) of the PNIC, a plurality of mappings with each mapping associating a virtual port identifier (VPID) of an interface of one machine executing on the host computer with a physical port identifier (PPID) of an interface of the PNIC;
   storing, in a flow entry table of the FPO, storing a plurality of flow entries, each flow entry in the plurality of flow entries associating a set of flow attributes with a VPID; and
   configuring the FPO, for a received data message, (1) to identify a flow entry that specifies a VPID as a destination of the data message, and (2) to use the identified VPID to identify a mapping in the mapping table that associates the identified VPID to a PPID of the PNIC interface that should be used as an egress interface of the PNIC for sending out the received data message.

14. The method of claim 13 further comprising providing the plurality of mappings from a flow processing and action generator that generates the mappings based on configuration data regarding VPIDs and PPIDs received by the flow processing and action generator.

15. The method of claim 13 further comprising providing the flow entries from the flow processing and action generator that processes a first data message in each data message flow to identifies a destination of the first data message, generates a flow entry based on the identified destination, and provides the flow entry for storing in the flow table for the data message flow for use for subsequent data messages of the data message flow.

16. The method of claim 15, wherein at least one processing unit of the PNIC executes the flow processing and action generator.

17. The method of claim 15, wherein at least one processing unit of the host computer executes the flow processing and action generator.

18. The method of claim 13, wherein the mapping table is stored in a content addressable memory unit.

19. The method of claim 13, wherein the flow entry is stored in a content addressable memory unit.

20. The method of claim 13, wherein at least one PNIC interface is a physical function (PF) of a bus that is used to connect the PNIC to the host computer.

* * * * *